United States Patent [19]

Suskind et al.

[11] 4,076,879

[45] Feb. 28, 1978

[54] SHEET MATERIAL

[75] Inventors: Stuart Paul Suskind, Montclair; Stanley George Sova, Clifton, both of N.J.

[73] Assignee: Inmont Corporation, New York, N.Y.

[21] Appl. No.: 616,714

[22] Filed: Sep. 25, 1975

Related U.S. Application Data

[63] Continuation-in-part of Ser. No. 512,265, Oct. 4, 1974, abandoned.

[51] Int. Cl.$^2$ ............................ B32B 5/12; B32B 7/02
[52] U.S. Cl. .................................... 428/113; 428/151; 428/215; 428/218; 428/288; 428/296; 428/303; 428/317; 428/904
[58] Field of Search ............... 428/113, 114, 151, 215, 428/218, 286, 288, 296, 303, 317, 320, 425, 904

[56] References Cited

U.S. PATENT DOCUMENTS

| | | | |
|---|---|---|---|
| 3,460,969 | 8/1969 | Murphy | 427/354 |
| 3,481,767 | 12/1969 | Craven et al. | 428/425 |
| 3,483,069 | 12/1969 | Cairns et al. | 428/113 |
| 3,501,326 | 3/1970 | Hochberg et al. | 428/425 |
| 3,574,106 | 4/1971 | Bragg | 428/904 |
| 3,620,811 | 11/1971 | Morrissey et al. | 428/904 |
| 3,634,184 | 1/1972 | Wang | 428/904 |
| 3,687,715 | 8/1972 | Kigane et al. | 428/215 |
| 3,764,363 | 10/1973 | Civardi et al. | 428/425 |
| 3,873,406 | 3/1975 | Okazaki et al. | 156/237 |
| 3,914,501 | 10/1975 | Miller et al. | 428/288 |

FOREIGN PATENT DOCUMENTS 2,207,725  11/1972  Germany.
1,383,597  2/1975  United Kingdom.

Primary Examiner—William R. Dixon, Jr.

[57] ABSTRACT

Upholstery material and shoe upper material made from a base sheet of criss-crossing elastomeric polyurethane fibers running parallel to the surfaces of the sheet, said fibers being bonded together at their points of contact. In one preferred form the product has a preformed skin whose thickness is less than about 100 microns and preferably less than about 50 microns, such as about 20 to 40 microns and the skin is joined to the fibers of the base sheet by spaced fingers of a binder.

6 Claims, 50 Drawing Figures

[picture damaged]

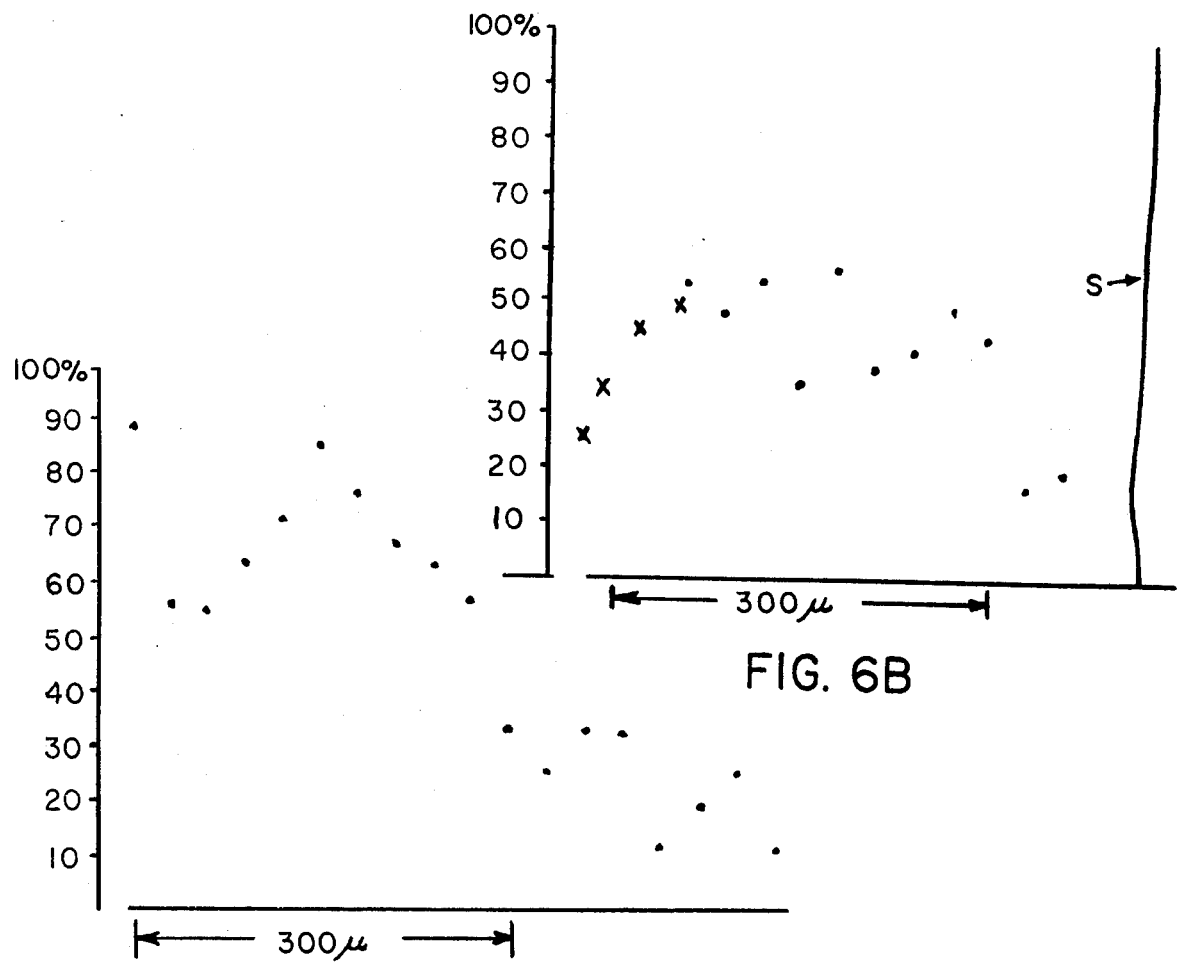
FIG. 6B
FIG. 5B
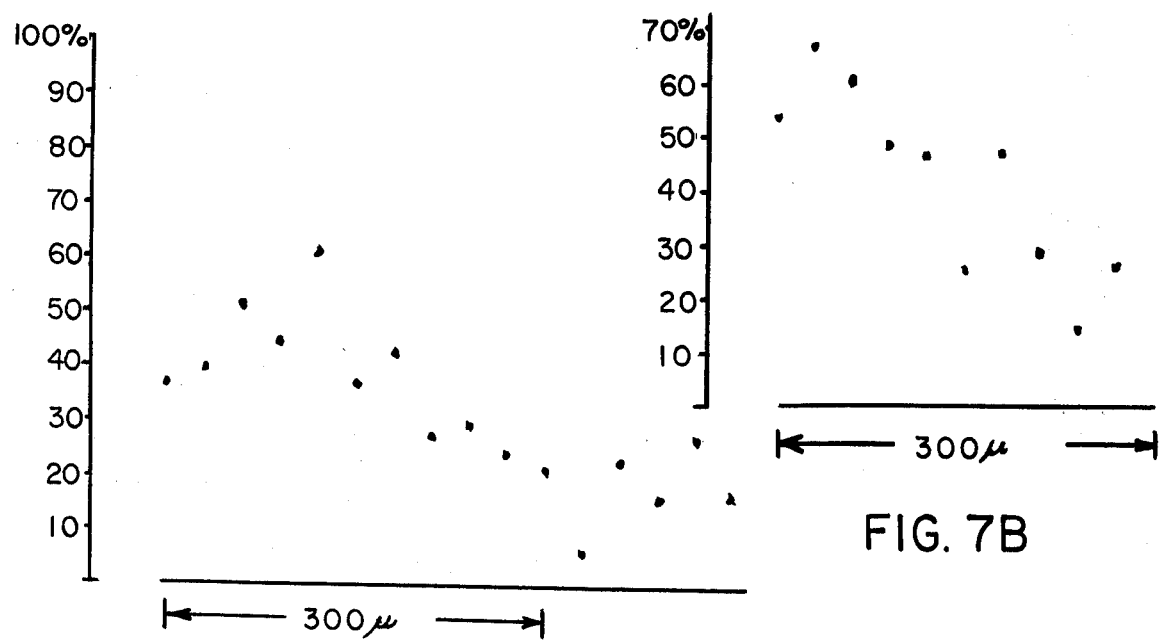
FIG. 7B
FIG. 8B

Scale for Figs 10B,C,D,E:
⊢—300μ—⊣ scale for Figs 10B-1, C-1, D-1, E-1:  |←—100μ—→|

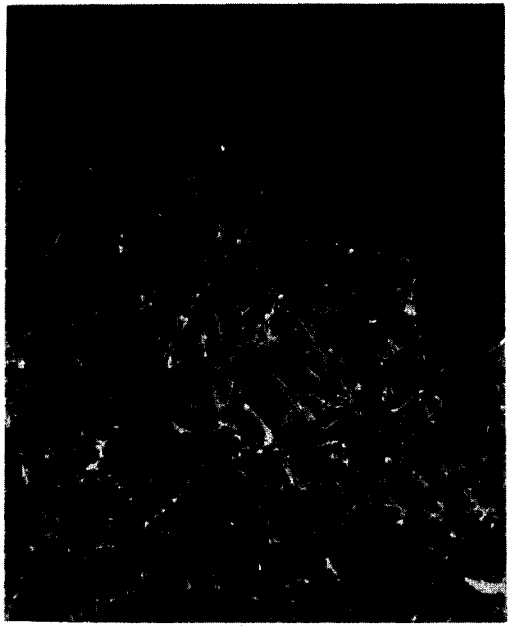
FIG. IIA  |←300μ→|
|←—100μ—→|  FIG. II A-I
FIG. 12  |←300μ→|
|←—100μ—→|  FIG. IIB scale for FIGS 13,14,15:
⊢— 300μ —⊣

FIG. 13A
FIG. 13B
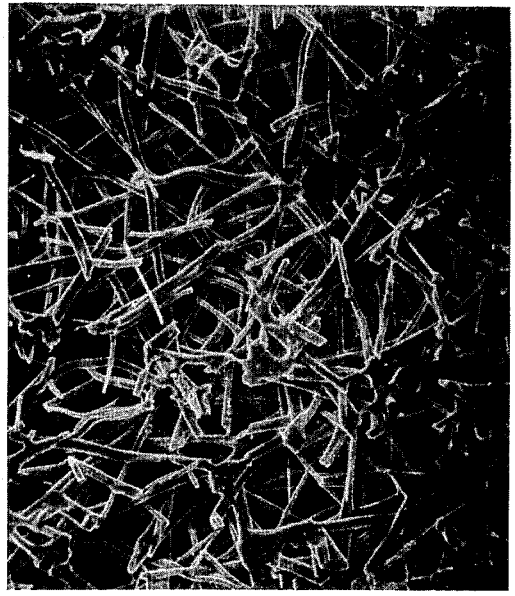
FIG. 13C
Scale for Figs 13A,B,C,D: |←—300μ—→|
FIG. 13D
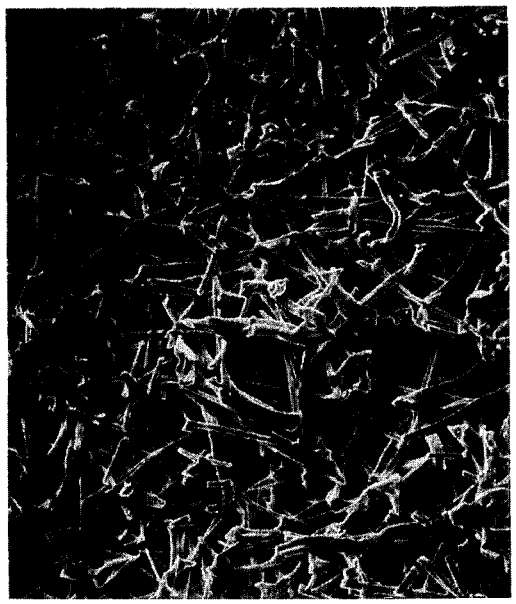
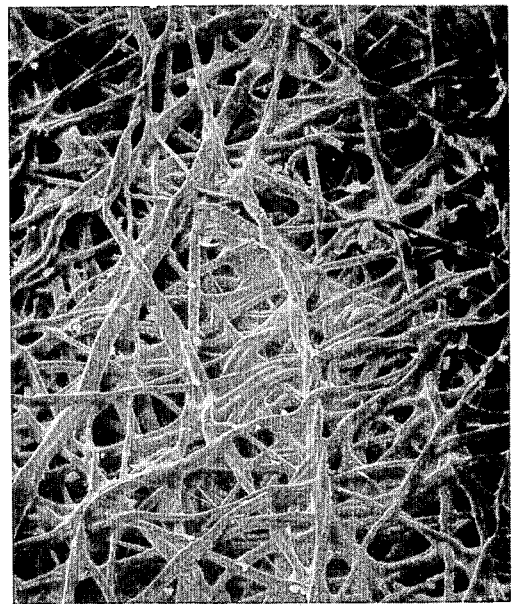

SHEET MATERIAL

This application is a continuation-in-part of our earlier copending application Ser. No. 512,265 filed Oct. 4, 1974, now abandoned whose entire disclosure is incorporated herein by reference.

This invention relates to sheet products particularly suitable for use in upholstery and to sheet products especially suited for use as shoe upper material.

In one aspect of this invention a thin substantially non-porous preformed elastomeric skin (preferably of polyurethane) is adhered to a base sheet of criss-crossing elastomeric polyurethane fibers running parallel to the surfaces of the sheet, said fibers being bonded together at their points of contact. The preformed skin has a thickness of less than about 100 microns and preferably less than about 50 microns, such as about 20 to 40 microns. In a preferred form the production has a substantially nonporous upper zone joined to the fibers of the base sheet by spaced fingers of adhesive.

The present invention provides, in one aspect, a flexible, durable leatherlike sheet material particularly suitable for upholstery of household furniture and automobile furniture (i.e. seats) where the appearance and tactile qualities of soft leather are desirable. Polyurethane coated fabrics designed for these markets are known to the art. They are typically comprised of a urethane film bonded to a napped woven or knit substrate. These materials are notoriously poor in snag and mar resistance, are anisotropic and are deficient in tear and seam strength in one direction, and generally lack the durability required for these applications. Attempts to improve these deficiencies have been met with limited success usually resulting in a loss of flexibility, softness and related aesthetic properties. The present invention provides a new coated fabric with greatly improved surface toughness and tear properties over prior art combined with the supple, flexible qualities of natural leather. Furthermore, the present invention provides a unique product having multidirectional stretch and conformability required in upholstering complex modern furniture.

Preferably the fibrous base sheet of criss-crossing elastomeric polyurethane fibers running parallel to the surfaces of the sheet and bonded together at their points of contact is produced in the manner described in Fine and deTora application Ser. No. 486,567 filed July 8, 1974 (published German patent application No. 2,207,725 and British patent No. 1,383,597).

Certain aspects of the invention are illustrated in the drawings, in which FIGS. 1–9 and corresponding FIGS. 1A–9A are photomicrographs (made with a scanning electron microscope) of cross-sections of the product, the cross-sections being obtained by cutting perpendicularly through the thickness of each sheet with a razor. In viewing the photographs it should be borne in mind that the scanning electron microscope has a great depth of focus enabling one to, in effect, see into the interior of the structure. The white bands seen at the top of the structures (such as the band marked "A" in FIG. 1) result from reflections from portions of the upper surface of the skin beyond the plane of the cross-section. The undulating or irregular surface of the skin is due, in part, to the fact that the release paper has an embossed "grain" (its surface is irregular so as to impart to a skin cast thereon a topography simulating that of grained leather, as is conventional in the art). The scale for FIGS. 1–9 is shown next to FIG. 1; the scale for FIGS. 1A–9A (which correspond to FIGS. 1–9, respectively, but are taken at greater magnification) is shown next to FIG. 1A. Further discussion of scanning electron photomicrographs is found, for instance, in Civardi et al U.S. Pat. No. 3,764,363, which also discusses leather-like "break".

FIGS. 1B–9B are graphical tabulations based on rough measurements made on FIGS. 1–9 respectively, to indicate the solids proportions at various levels of the structure. In each of FIGS. 1B–9B the ordinate indicates the linear proportion of solid (in the plane of the cross-section of the sample) found in the line on which the measurement is made, while distances along the "x" axis show the distances, in the sample, between the lines along which the measurement were made. For instance in making the measurements for FIG. 1B the technician laid a straight edge horizontally across the photograph (FIG. 1) along the line 3—3 and, using dividers, measured the length along that edge of each area that appeared to be a solid in the plane of the cross section, added up all those lengths and indicated the total solid length on the graph at point "e" (the total length along the line 3—3 being of course 100% 1.0). The technician then laid the straight edge horizontally across FIG. 1 along a second line which was spaced below line 3—3 by a distance equivalent to 30 microns of the sample (see the scale on FIG. 1) and again measured the lengths, along that second line, of each area that appeared to be a solid in the plane of the cross section and entered the total solid length along the second line at point "f", and so on for the other points shown in FIG. 1B. Measurements were not made on areas which are outside the plane of the cross-section. For instance area 9 (in FIG. 1A) is clearly the portion of a fiber which is within the sample and below the cross-sectional plane; area 9 was therefore not measured. On the other hand, area 10 (in FIG. 1A) was measured since it clearly represents the cut surface of the same fiber, said area 10 being in the plane of the cross-section. It will be understood that this technique gives a general, rough, idea of variations in percent solids (or its reciprocal, percent voids) in the sample and that there are of course errors in measurement as well as variations in different parts of the same sheet.

FIGS. 1 and 1A illustrate a product made (as described more fully in Example 1 below) by forming a solid elastomeric polyurethane skin 11 having a dry thickness of about 45 microns on temporary support (conventional release paper) then applying a layer of adhesive (a solution of elastomeric polyurethane in volatile solvent) on the skin, applying the adhesive to the sheet 12 by bringing the wet adhesive layer into face-to-face contact with one surface of the fibrous sheet 12 and passing the assemblage (or release paper, skin, adhesive and fibrous sheet) through the nip of a pair of high pressure squeeze rolls, then evaporating off the solvent by heating, and mechanically stripping off the release paper. (As is conventional, the squeeze rolls may comprise a roll having a fixed axis and a cooperating pressure roll which is forced toward the other roll, as by a suitable weight or hydraulic cylinder). The resulting product is not a preferred material, e.g. as a substitute for soft upholstery leather; it does not show a leather-like break. It will be seen in FIGS. 1 and 1A that the adhesive has formed a layer 13, which is unitary with the original skin layer 11, (and is distinguishable therefrom in the photographs by a slight difference in shade) and that the adhesive has not penetrated much into the structure of the fibrous sheet. The combination of skin and adhesive forms a substantially non-porous layer whose thickness is well over 70 microns (as can be measured on FIG. 1) being as much as 80 or 100 microns or more in many places. There is a sharp increase in pore volume below that non-porous layer. For instance, FIG. 1B indicates that along the straight horizontal line 3—3 the proportion of solid (in the plane of the cross-section) is 80-90%; along a line 60 microns above 3—3 it is substantially 100% (not shown in FIG. 1B), along the line spaced 30 microns below 3—3, it is only about 50%; along lines spaced 120 microns or more below 3—3 it is well below 40% as is characteristic of the untreated fibrous base.

FIGS. 2 and 2A illustrate a product made (as described more fully in Example 2 below) in a manner similar to the product of FIG. 1, using a polyurethane latex adhesive and applying no nip pressure to the assemblage. Here again the product does not have a good leather-like break. It will be seen in FIGS. 2 and 2A that the original skin layer 16 has been supplemented by an integral adhesive layer 17 so that the thickness of the non-porous zone is about 100 microns or more, and that there is substantially no penetration of adhesive into the fibrous sheet. This is confirmed by the pattern illustrated in FIG. 2B; it will be understood that since the upper surface in FIG. 2 is tilted the parallel lines used for these measurements are similarly tilted. The point marked "g" on FIG. 2B is the measurement taken along a straight line generally parallel to the effective skin 16-17 and passing through the depending protuberances P and P[1]. The other measurements are taken along lines parallel to that straight line.

FIGS. 3 and 3A illustrate a product made (as described more fully in Example 3 below) in a manner similar to the product of FIG. 1 but applying a polymer latex to the surface of the fibrous sheet to "prefill" a surface zone of that sheet before the solvent based adhesive is applied to the sheet. It will be seen that just below the original substantially non-porous skin layer 21 (some 40-50 microns thick) there is an adhesive layer 22 which is porous and of low specific gravity, having relative large bubbles 23. At least some of these bubbles seem to be communicating with other bubbles; the bubbles may result from temporary trapping of solvent vapors during the heating step. The product has a "hand" like that of soft leather and exhibits a desirable fine leather-like break.

In FIG. 3B the point "h" represents the measurement along a straight horizontal line just passing through the tops of the bubbles 23, and the other points represent measurements along lines spaced below the first line and parallel thereto. It will be seen that there is a sharp drop in the linear proportion of solids just below the skin and that the solids content in the underlying zone is somewhat higher than that in FIG. 1B indicating that the adhesive has penetrated to a distance of considerably more than, say, 100 microns below the skin. The linear proportion of solids in the zone about 100 to 200 microns below the skin is generally below about 50%.

FIGS. 4 and 4A illustrate a product made (as described more fully in Example 4 below) in a manner similar to the product of FIG. 1 using an elastomeric polyurethane latex adhesive which is applied to a damp (pre-wet) fibrous sheet. It will be seen that the thin skin 24 (about 20 to 30 microns thick) is joined to the fibrous sheet by fingers or "roots" 25, 26, 27 of adhesive which penetrate into the upper zone of the fibrous sheet and which increase or reinforce the fiber-to-fiber bonding. The product has a very good leather-like feel and break.

Since in FIG. 4 the skin is quite wavy (owing to the marked grain pattern of the release paper on which the skin was formed), the first four measurements of linear proportion of solids (for FIG. 4B) just below the skin were not made with a straight edge. Instead an edge conforming to the bottom of the skin (having the configuration indicated as "j" adjacent FIG. 4B) was used. The resulting points are indicated by crosses. The point "d" on FIG. 4B represents a measurement made along such an edge when the latter is held in a first position at a distance equivalent to about 15 microns below the skin; points "l", "m" and "n", respectively, represent measurements made with the same edge held at the equivalent of some 15, 45 and 75 microns below that first position. Point "o" represents a measurement made along a straight horizontal edge situated at the equivalent of another 30 microns (measured along the right hand boundary of the photograph) below the last (lowest) position of the wavy edge. All the other points represent measurements along straight horizontal lines parallel to that used for measuring point "o". It will be seen in FIG. 4B that the linear proportion of solids drops sharply below the skin and then remains generally higher than about 30% (but generally lower than about 50%) for a further distance of considerably more than 100 microns below the skin, again indicating penetration by the adhesive.

FIGS. 5 and 5A illustrate a product made (as described more fully in Example 5 below) in a manner similar to the product of FIG. 1 using an elastomeric polyurethane latex adhesive which is applied to a dry fibrous sheet. Here again the skin is joined to the fibrous sheet by the fingers or roots of adhesive but the substantially non-porous zone is thicker because of the presence of an almost continuous layer of adhesive so that, over a major portion of the area of the sheet, the thickness of that zone is about 50 microns. While the product is useful for many purposes it is inferior to that of FIG. 4 in its feel and break.

FIG. 5B indicates that the linear proportion of solids remains relatively high (above about 50%) even in the zone that is some 100-200 microns below the non-porous zone.

FIGS. 6 and 6A illustrate a product made (as described more fully in Example 6 below) in a manner similar to the product of FIG. 1 using an elastomeric polyurethane latex which is applied to a dry fibrous sheet and using a stop to limit the travel of the pressure roll so that the roll surfaces can approach each other no closer than, say, about 10 to 20 mils (about 250-500 microns) plus the thickness of the release paper. This modification yields a structure in which the thickness of the original skin is scarcely increased by the presence of the adhesive, the total non-porous zone thickness being generally below about 50 microns and that zone being joined to the fibrous sheet by spaced fingers or roots 28, 29, 30, 31 which do not increase the solids proportions in the next underlying zone to nearly the extent found in FIG. 5. Thus these fingers are so spaced that their bases, at said non-porous zone, comprise well below one half (such as ⅓ or less) of the length of the skin. The product has very good leather-like feel and break.

As with FIG. 4 and 4B, because of the waviness of the non-porous zone in FIG. 6, the first four measurements just below that zone for FIG. 6B were made with an edge conforming to that zone (having the configuration indicated as "s" adjacent to FIG. 6B) and the resulting points are indicated by crosses. Again, the next measurements were made with a straight horizontal edge, the first such measurement being made with the horizontal edge situated the equivalent of some 10 microns (measured along right hand boundary of the photograph) below the last (lowest) position of the wavy edge. Here again there is a sharp drop, e.g. to a linear solids proportion below 50% (such as about 30%) just below the non-porous zone and the solids proportion remains in the range of about 30–60% for a considerable distance below that zone.

FIGS. 7 and 7A and 8 and 8A show products made by a method like that used for FIG. 6, with fibrous sheets of different densities; see Examples 7 and 8, respectively, for details. In FIGS. 7B and 8B there are shown measurements made along straight horizontal lines starting at the equivalent of about 100 microns below the skin. In FIG. 7B the linear solids proportion in the zone some 100–200 microns below the skin is in the range of about 50–70%; in FIG. 8B it is in the range of about 35% to 50 or 60%.

FIGS. 9 and 9A illustrate a product made, without adhesion, by forming and depositing fibers directly onto the skin, using the skin (on the release paper) as the collecting surface in the process described in said Fine and deTora application. The product has a good leather-like break but its abrasion resistance is significantly lower than that of the products of, say, FIGS. 3, 4, 6, 7 and 8. It would appear that the skin in FIGS. 9 and 9A is not nearly as well bonded to the upper fibers and/or the latter are not nearly as well bonded to their contacting fibers as when the adhesive is present and thus the skin is not reinforced to the same degree. It will be seen that in this particular sample there are distinct areas where fiber formation is incomplete. In FIG. 9B the points represent measurements along straight horizontal line the first such line being just below the skin.

It will be understood that in products illustrated in the accompanying Figures the lower portions (e.g. the lower third or lower half) are of relatively low density such as below 0.4 g/cc or lower, e.g. about 0.2 to 0.3 g/cc.

In the following Examples (which are given to illustrate the invention further) the polyurethane of the base sheet is typically a polyether polyurethane made, in 20% solution in tetrahydrofuran in conventional manner, from poly-tetramethyleneglycol of average 1000 average molecular weight, 1,4-butanediol and 4,4'-diphenylmethane diisocyanate and having a nitrogen content of 4½%, a number average molecular weight of 25,000 and an intrinsic viscosity (measured at 25° C in tetrahydrofuran) of 1.070; when a film is cast therefrom it typically has a tensile strength of 4300 psi, an ultimate elongation of 470% and a 25% modulus of 646 psi. Before the filament-forming and depositing operation it is mixed with fire retardants (hexabromobiphenyl, sold as "BP-6", and antimony trioxide, each being present in proportion of about 5% based on the weight of polyurethane) and pigment (such as about 1%, based on the weight of the polyurethane, of a suitable colored pigment). The base sheet is produced in the manner described in the aforementioned Fine and deTora application. The skin is formed by applying, to a support having a surface which resists adhesion (e.g. conventional release paper), a coating of a solution of elastomeric polyurethane in a volatile solvent and evaporating the solvent. For example one may use a 35% solution of a polyester-polyurethane such as a commercial material known as Witcobond Y-343 (from Witco Chemical) which is a 35% solution of light-stable aliphatic polyurethane elastomer in a mixed solvent (25% dimethylformamide, 35% isopropyl alcohol, 15% toluene, 25% methyl cellosolve), the polyurethane having an elongation at break of 475%, a softening point of about 250°–300° F, a tensile strength of about 5000–7000 psi (ASTM D-412), its moduli at 100%, 200% and 300% elongation being 800, 1100 and 2000 psi respectively, said solution also containing dispersed therein antimony trioxide and "BP-6" (hexabromobiphenyl) as flame retardants, together with pigments (the ratios of polymer to antimony trioxide, PB-6, and pigment being respectively, about 20:1, 20:1 and 3:1. The coated release paper may then be passed through an oven, at, say, about 300°–325° F to remove substantially all the solvent. When an adhesive is used the release paper carrying the skin is then coated with a thin layer of the adhesive. This may be a solution (e.g. in a volatile solvent) or a dispersion, such as a viscous latex. One may employ, as the latex adhesive, an aqueous dispersion of an elastomeric polyurethane ionomer of the cationic or anionic type (such as described, for instance, in the article by Dieterick, Keberle and Witt "Polyurethane Ionomers, a New Class of Block Polymers" in Angew. Chem. Intern. Edit. Vol. 9 (1970) No. 1 p. 40–50 and references cited therein. A thickening agent, such as a water-soluble high polymer may be included to increase the viscosity.

EXAMPLE 1

(In this Example the fibrous sheet (the substrate) has a density of about 0.23 g/cc and is about 46 mils thick. The adhesive is a two-component solvent-based adhesive of conventional type containing a mixture of 150 parts of a low molecular weight polyurethane having alcoholic hydroxyl end groups (Impranil C) and 22.4 parts of a low molecular weight curing reactant having terminal isocyanate groups (Mobay CD-75 or Vorite 144, an adduct of toluene diisocyanate and trimethylolpropane) in 350 parts of solvent (a mixture of equal parts of dimethylformamide and methyl ethyl ketone) containing 7.5 parts antimony trioxide, 7.5 parts BP-6 (hexabromobiphenyl) and 46.4 parts of a concentrated dispersion of pigments in methyl ethyl ketone. The adhesive is applied as a layer 7 mils thick (wet thickness) to the skin on the release paper; the fibrous sheet is immediately placed on the wet adhesive layer and the assemblage is immediately passed through the nip of the squeeze rolls. and then passed into drying ovens (e.g. at up to about 300° F) to remove solvent, after which the release paper is stripped off.

EXAMPLE 2

Example 1 is repeated using a substrate having a density of about 0.27 g/cc and a thickness of 31 mils, and a latex adhesive, deposited at a wet thickness of about 8 mils. The adhesive is a mixture of 110 parts Impranil DLN Dispersion (a milky latex containing 40% anionic thermoplastic aliphatic polyester polyurethane and having a pH of 6 to 7, a particle size of 0.1 to 0.2 micron and a viscosity of 220 cps, measured with Brookfield LVG type at 20° C, Spindle No. 1 at 12 rpm); 4.8 parts Impranil Thickener PW (an aqueous solution of polyvinylpyrrolidone) and 11.6 parts of an aqueous 30% dispersion of Oncor 75 RA (a fire retardant composed of silica-treated antimony trioxide). The polyurethane in Impranil DLN is one which, in a 0.1 mm thick film, has an ultimate tensile strength of about 3550 psi, an elongation at break of 700%, a 100% modulus of 270 psi and a Shore A hardness of 60, and volume swell values at room temperature of 450% in trichloroethylene, 10% in water and 250% in perchloroethylene. No nip pressure is used in making the laminate; the latter is dried in an oven at 250° F (e.g. for 3 minutes) before stripping off the release paper.

EXAMPLE 3

Example 1 is repeated except that the surface of the fibrous sheet is "pre-filled" (as described below) before it is brought into contact with the wet solvent-based adhesive.

In the pre-filling step a latex of a polyurethane elastomer is applied to the surface of the fibrous sheet and dried thereon. More particularly the following latex is employed: a mixture of 450 parts of Geon Latex 660×2 (49.1% non-volatiles, a dispersion of polyvinyl resin), 162 parts of water and 135 parts of Carboset K718 (sodium polyacrylate solution in water, a thickener). The latex is metered onto the fibrous sheet by first depositing a 5 mil thick (wet thickness) layer of the latex onto release paper, then bringing the surface to be pre-filled into contact with the wet latex layer while the substrate is damp (having been wet-out and squeezed as in Example 4, below) then applying pressure to the assemblage, allowing the assemblage to stand for 1 minute at room temperature, mechanically separating the release paper from the resulting assemblage, and drying the prefilled substrate (e.g. at 300° F for 3 minutes); the latex is attracted to, and penetrates, the fibrous sheet, and the release paper strips off easily with substantially no retained latex thereon. The prefilling step may be controlled (by routine, simple trial-and-error experiments) in relation to the other steps to avoid creating a prefilled zone which is so solvent-impermeable that the solvent attacks the skin layer, forming holes in the skin, and also to avoid creating pre-filled zone that is so permeable as to give an effect like that of FIGS. 1 and 1A instead of the porous adhesive zone such as shown in FIGS. 3 and 3A.

EXAMPLE 4

Example 1 is repeated using a substrate having a density of 0.30 g/cc and a thickness of 37.4 mils and a latex adhesive deposited at a wet thickness of about 7 mils. The adhesive is the same as that used in Example 3 except that the proportions are 100 parts of the Impranil DLN Dispersion, 5.7 parts of the Impranil Thickner PW and 13.4 parts of the Oncor 75RA. Before bringing the fibrous base sheet into contact with the wet adhesive layer the sheet is wet with water containing 0.1% surfactant (namely dioctyl sodium sulfosuccinate) by squeezing it, and then releasing the pressure while contacting its surface with water, as by passing it through the nip of a pair of rolls beneath the surface of the water bath, so that on re-expansion after squeezing the sheet takes up, say, about 80–100% of water, based on its dry weight; after leaving the bath the wet sheet is squeezed so that it retains some 25–35% (based on its dry weight) of water. The resulting damp sheet is placed on the wet adhesive and the resulting assemblage is passed through the nip. The laminate is dried in an oven at up to 325° F to evaporate the water, before stripping off the release paper. The laminate is then colored (by printing) and top-coated (with a very thin layer of elastomeric polyurethane).

EXAMPLE 5

Example 1 is repeated using the latex adhesive of Example 4. The wet thickness of the deposited adhesive layer is about 8 mils and the drying thereof is carried out at 300° F. The substrate used in this Example has a density of about 0.33g/cc and a thickness of 33 mils.

EXAMPLE 6

Example 1 is repeated using the latex adhesive of Example 4 and using a stop to prevent the pressure roll from approaching the fixed-axis roll closer than a distance of about 250 microns (10 mils), plus the thickness of the release paper. The substrate used in this Example has a specific gravity of about 0.26g/cc and a thickness of about 39 mils. The laminate is then colored (by printing) and top-coated (with a very thin layer of elastomeric polyurethane).

EXAMPLE 7

Example 6 is repeated using a substrate having a density of 0.22g/cc and a thickness of about 49 mils, the adhesive being deposited at a wet thickness of about 10 mils, the drying effected at about 300° F.

EXAMPLE 8

Example 7 is repeated using a substrate having a density of 0.27g/cc and a thickness of about 41 mils.

Excellent results have been obtained using fibrous substances having average densities of in the range of about 0.2 to 0.35g/cc and thicknesses in the range of about 30 to 50 mils (about 700–1300 microns), such as sheets weighing about 7½ to 8½ ounces per square yard. (about 250 to 300 g/m$^2$). Typically the average diameter of the individual fibers of the substrate is in the range of about 5 to 20 microns usually about 10 to 15 microns and the average denier per filament is below 10, such as in the range of about 1 to 5, and the substrate has an elongation at break of well over 250% e.g. about 400%, or more, has a soft hand, may be easily compressed transversely between one's fingers to, say, 50% of its uncompressed thickness and is water-repellant (e.g. when a drop of water is placed thereon it tends to rest on the surface without penetrating). The entire disclosure of the aforesaid Fine and deTora application is incorporated herein by reference; that application describes the making and properties of substrates of this type.

Preferred products of this invention have high elongations at break, generally well over 200%, such as in the range of 300–500%, e.g. 350–450% and high trapezoidal tear strengths, such as above 10 pounds, and they are substantially isotropic.

The following properties are typical of a preferred product obtained in accordance with this invention:

| | |
|---|---|
| Unit weight (oz/yd$^2$) (ASTM D 75-73) | 13.7 |
| Thickness (mils) (ASTM D 75-73) | 38 |
| Grab Tensile, lb. (ASTM D 75-73) | 74M 70T |
| Tear Strength | |
|     Tongue tear, lb. (ASTM D 75-73) | 6M 6T |
|     Trapezoidal tear (ASTM D 2263-68) | 14M 15T |
| Elongation at Break, % (ASTM D 75-73) | 366M 414T |
| Newark Flex (60,000 cycles) (CFFA-10) | No cracking |
| Wyzenbeck Abrasion | |
| (#8 Duck, 100,000 cycles) (CFFA-2G) | No change |
| Taber Abrasion (CS-17 Wheel, | |
| 1500 cycles, 500g weight) | Gloss change only |
| Hoffman Snag (2000 g) | Very slight |

| | |
|---|---|
| -continued | |
| Water vapor transmission (g/m²/hr) (ASTM E 96–66) | 25 |
| Seam strength (ASTM D 1683–68) | 35–50 |
| Force (pounds per inch of width) needed to stretch material | |
| 5% | 2.5 |
| 10% | 4 |
| 25% | 7.5 |

Especially good properties are obtained when the preformed skin has a thickness in the range of 20 to 50 microns and has a 100% modulus about the same as that of the material of the underlying base sheet (as when the ratio of the 100% modulus of the skin to that of the base sheet material is in the range of about 1:2 to 3:2 such as about 0.7:1 to 1:1) and when the adhesive joining the skin to the base sheet has a lower 100% modulus than that of skin or base sheet material (such as a 100% modulus which is ⅔ or ½ or ¼ of that of the base sheet). Thus, with a fibrous sheet made of a polyurethane having a 100% modulus of about 1000 pounds per square inch, a skin having a modulus below about 1400 psi, such as about 800 psi, has given very good results, with an adhesive having a 100% modulus below 800, such as below 600 psi. One suitable adhesive has a 100% modulus below 500 psi, such as about 200 to 400 psi, while the use of a skin having a 100% modulus of, say, 2000 psi has yielded a less desirable stiffer product which after stretching (e.g. 100–200%) and release shows a delayed recovery period during which its surface exhibits a pattern of corrugations or regular wrinkles; in contrast the appearance of the preferred product after stretching and release is substantially the same as its original appearance. Preferably the 100% modulus of the skin is well over 500 or 600 psi and its elongation at break is at least about 350%. As noted previously the adhesive may, with the preformed skin, form a two-layer substantially non-porous upper zone; in preformed forms of the invention these two layers (when present) have different stretch characteristics, the lower, adhesive-derived, layer being of more yielding material (as indicated by the 100% modulus). Also as previously noted, the adhesive (as in the form of fingers of adhesive) may reinforce the fiber-to-fiber bonds (e.g. an adhesive finger adhering to two contacting fibers) or even create additional fiber-to-fiber bonds; in preferred forms of the invention such reinforcement or new bonds may be more yielding than the original bonds.

The skin is preferably of pigmented polymer of a type resistant to ultra-violet, such as an aliphatic (including cycloaliphatic) polyurethane; such polymers are well known in the art. The fibrous base sheet may be of light-sensitive polymer, such as known aromatic polyurethanes and is protected from attack by the light-resistant skin.

As can be seen from the Figures and the foregoing discussion thereof, the thickness of the upper substantially non-porous zone of the product is preferably less than about 100 microns and, in certain preferred forms of the invention, the structure is characterized by the presence of large voids whose dimensions (viewed in cross section) are at least about 30 microns by 30 microns occupying at least about one third (such as about one half or more) of the zone just below said non-porous zone.

Release papers for forming polyurethane skins for subsequent adhesion to a substrate are well known in the art. See, for instance, U.S. Pat. Nos. 3,574,106; 3,650,880; 3,684,637; and published application T896018 (ser. 111,654 filed 2-1-71, 896 O.G. 19). The release paper preferably has a topography such to produce a cast-embossing, such as a leather-like grain, on the surface of the skin cast thereon. Release paper is commercially available in many such grain patterns, such as "buffalo", "gloveskin", "kid grain", "hi calf", "box calf", continental calf", "scotch grain", "seville", "bison", etc. from such companies as S. D. Warren and in various grain depths. The products of this invention substantially retain such grain pattern without the need for subsequent embossing. Measurement of the broad "valley" at about the middle of the portion of skin shown in FIGS. 8 and 8A indicates a grain depth of about 30 microns.

The Fine and deTora application discloses and discusses various types of polyurethanes, their properties, and compounding procedures. Instead of using an elastomeric polyurethane as the adhesive, other flexible polymers may be employed. For instance excellent results have been obtained with an acrylic polymer emulsion (such as Rohm & Haas Rhoplex N-45, applied at 56–68% solids; viscosity of say, about 1500 cps; average particle size about 0.4 – 0.5 microns). It is also within the broader scope of the invention to employ water-insoluble elastomeric materials other than polyurethanes for the skin layer and for the fibers of the substrate as well as for the adhesive. Such elastomers are well known in the art; see for instance, the article on "Elastomers, Synthetic" in Encyclopedia of Polymer Science and Technology Vol. 5 (1966), John Wiley & Sons, and particularly the various types of elastomers listed at page 406–420 thereof. Especially suitable are those elastomers, there listed, which are soluble and do not require subsequent vulcanization to attain high tensile strengths.

Those skilled in the art will appreciate that with variations in available equipment and adjustments thereof, appropriate variations in formulations and/or methods may be needed to attain the preferred structures. For instance, it has been found that when employing laboratory equipment a given latex adhesive of high viscosity, and relatively large particle size, e.g. > 1 micron, had to be diluted to greatly reduce its viscosity (e.g. from 170 poises down to 10 poises) to obtain the best results, but the same latex could be applied successfully without dilution when production equipment was employed; it is believed that the greater and more uniform pressure of the production type nip rolls may have facilitated this by driving the adhesive more deeply into the dry substrate and avoiding a substantial increase in skin thickness which would result from the presence of an insufficient movement of the adhesive into the fibrous structure. Guided by the teachings of this application, routine experimentation (as of that type) will enable those skilled in the art to practice the invention readily on the particular equipment available to them.

In one embodiment of the invention the fibrous substrate is pre-treated to increase its modulus and/or its resistance to tearing in a direction normal to its upper and lower surfaces. This may be effected, for instance, by preimpregnating the substrate with a dilute latex (e.g. containing about 10 to 20% of dispersed polymeric adhesive) which increases the strength of the fiber-to-fiber bonds even in the portion of the sheet remote from the skin. The adhesive used for this purpose may be of any suitable type such as an elastomeric polyurethane, a vinyl chloride-ethylene copolymer (e.g. Monsanto Monflex). The amount of polymer so added to the sheet may represent less than 10% (e.g. 1 or 2 to 5%) of the weight of the fibrous substrate. This will generally be less than the amount of polymer supplied in the laminating adhesive which will often be more than 15% (and usually less than 40%, such as 20 to 25 or 30%) of the weight of the fibrous substrate. In the practice of the invention the latex-impregnated substrate is preferably assembled with the laminating adhesive layer before drying of the impregnant. An Example of the procedure employing such pre-treatment of the fibrous substrate is given below:

EXAMPLE 9

A fibrous substrate as in Example 1, 65.2 mils (1.66 mm) thick and weighing 11.3 oz./yd$^2$ (0.23 g/cc.), is impregnated with a 20% aqueous polyurethane dispersion (Impranil DLH Dispersion diluted with water to 20% solids). The amount of impregnation is 4.5% (solids basis). The wet impregnated substrate is laminated to a 1.5 mil (46 microns) thick polyurethane skin which had been preformed on release paper and coated with an 8 mil (.2 mm) thick layer of adhesive (as in Example 2). The wet impregnated substrate was laid onto the layer of adhesive. The lamination is carried out by squeezing the composite (wet substrate-adhesive-skin) between sheets of release paper to a thickness of 64 mils by placing it in an area bordered by shims and rolling a heavy roller over it, the roller contacting the shims. The laminate is then dried, and cured, for 4 minutes at 300° F. (149° C.). After stripping from the release paper, the skin is coated with a very thin coating of polyamide containing a flatting agent. The coating is, for example, Witco TC-1 (13% solution of polyamide in ethyl alcohol) having 2% silica flatting agent dispersed in it and was applied using a No. 18 Mayer Rod (which applies in the neighborhood of 0.1 to 0.3 (e.g. about 0.2) oz./yd$^2$ of polyamide.) The topcoated laminate is then cured for 1 minute at 300° F. (149° C.). The resulting product is soft, has a good leather-like break and good tear and tensile strength; trapezoidal tear (lbs., ASTM D2263-66) 17M 13.1 T., Grab Tensile (pounds, ASTM D75-73) of 88 M 93 T, percent elongation at break (ASTM D75-73) of 438 M 430 T. It is suitable for use as upholstery material.

Impranil DLH is a milky latex containing 40% anionic high molecular weight, thermoplastic, aliphatic polyester polyurethane, having a particle size of 0.1 to 0.4 microns, specific gravity of 1.1 and a viscosity of 220 cps., as measured with a Brookfield LVF type viscometer at 20° C. using Spindle #1 at 12 rpm. Typical physical properties for 0.1 - 0.2 mm films formed from the Impranil DLH polyurethane are:

| | |
|---|---|
| Ultimate Tensile Strength | 5,900 psi |
| Elongation | 600-700% |
| Modulus - 100% (psi) | 700-800 |
| Shore A Hardness | 93 |

A particularly attractive appearance and texture may be imparted to the laminates by hot wrinkling, giving the material the appearance of a wrinkled or boarded leather and further improving its break. This may be effected by, for instance, heating the laminate to say 250° F, letting it cool in air until it can be handled and then wrinkling and working it repeatedly by hand, or wrinkling it by stuffing it into a container, and letting it cool, say to room temperature, or (using machinery and techniques known for this purpose in the art of hot-wrinkling of polyurethane-coated fabrics) by stuffing it hot (e.g. at about 250° F) into a container and removing it therefrom after a few minutes (e.g. 10 minutes) residence time and then letting it cool. This process is particularly effective when an elastomeric adhesive having a relative low modulus at 10% elongation is employed, such as a 10% modulus of less than 50 pounds per square inch (measured on a film cast from said adhesive) or when the elastomeric adhesive has a low softening point, such as a softening point below about preferably below 150° C. For example, one particularly suitable adhesive (Millmaster Onyx "Polyurethane Latex 5HS") has a 10% modulus of about 20 pounds per square inch and has a stress-strain curve (measured on said cast film) defined by the approximate data given in the following table which also includes the characteristics of an adhesive which (when employed in the same process) has not given as good a wrinkled effect (the DLN of Example 2):

| Elongation % | | 5% | 10% | 50% | 100% | 200% | 300% | 650% |
|---|---|---|---|---|---|---|---|---|
| Tension (in pounds per square inch) at that elongation | 5HS | 15 | 20 | 50 | 250 | 300 | 350 | 3000 |
| | DLN | 30 | 70 | 205 | 250 | 300 | 350 | 3000 |

The softening point range for the 5HS (obtained by use of a different scanning colorimeter, which measures changes in the specific heat) is relatively broad, such as 195°–250° C; for the DLN it is also wide, such as 175°–260° C. Examples of elastomeric adhesives of low softening point are Mobay Chemical Corp. polyurethane latex KA8100 and KA8066; a particularly suitable adhesive is a blend of these two containing a major proportion of KA8100, such as a blend in which the ratio of KA8100 to KA8066 is about 2:1, e.g. a 70:30 blend, or about 5:1, e.g. an 85:15 blend, KA8100 and KA8066 are described in considerable detail in a 46 page publication of Mobay Chemical Corporation entitled "Compounding Guide for Polyurethane Latices KA8066 and KA8100 in Adhesive Applications" which (at page 2 thereof) gives the following tabulation of the physical properties:

| | KA 8066 | KA 8100 |
|---|---|---|
| Latex Properties: | | |
| Particle charge | Anionic | Anionic |
| Avg. particle size (micron) | Approx. 0.2 | Approx. 0.1 |
| Total solids (%) | Approx. 40 | Approx. 50 |
| Viscosity at 77° F/25° C. cps. (Brookfield RVT, SP 2, 50 RPM) | Approx. 70 | Approx. 500 |
| pH Value | Approx. 7.0 | 7.5 |
| Surface tension (dynes/cm.) | Approx. 44 | Approx. 50 |
| Weight per gallon (lbs.) | 8.9 | 9.1 |
| Specific gravity g/cm$^3$ at 68° F/20° C | Approx. 1.08 | Approx. 1.10 |
| Film Properties: | | |
| Appearance | Opaque, tough | Clear, flexible |
| Rate of crystallization | High | Low |
| Tensile at break (psi) | Approx. 4500 | Approx. 2100 |
| Elongation at break (%) | Approx. 560 | Approx. 700 |
| Set at break (%) | Approx. 32 | Approx. 9 |
| Modulus: (psi) | | |
| 100% | Approx. 1850 | Approx. 350 |
| 200% | Approx. 2000 | Approx. 450 |

| | KA 8066 | KA 8100 |
|---|---|---|
| 300% | Approx. 2050 | Approx. 500 |

In certain preferred forms of the invention the fibers of the base sheet are substantially unswollen by the applied liquid adhesive (or are protected against swelling attack), e.g. when an aqueous latex adhesive is employed with a base of water resistant fibers.

The invention makes possible the production of a very lightweight, highly flexible sheet product whose surface has excellent resistance to gouging, which shows no indication of an underlying fiber pattern (such as "orange peel") even when highly stretched, and which has good seam strength without requiring any woven, knitted or needled fabric reinforcement. (It is however within the broader scope of the invention to use the product in combination with a reinforcing fabric adhered thereto, such as with a backing of stretchable fabric, e.g. circular knit fabric). As previously mentioned the product has high multidirectional stretch and conformability making it especially suitable for upholstering complexly curved modern furniture. This conformability also includes an ability to recover, to a very high degree, to its original dimensions after the material has been subjected to the high strains which can occur in the use of such furniture; for instance, if the material covering the seat has poor recovery characteristics it will not have a smooth tight appearance when the sitter arises. The invention has provided upholstery sheet materials having the following tensile hysteresis characteristics (measured using cycles of 3 minutes under constant strain followed by 3 minutes of relaxation):

| % elongation | % of ultimate elongation | Cycle | % Set |
|---|---|---|---|
| 35 | 9 | 1 | 6.4 |
| | | 2 | 9.3 |
| | | 3 | 9.3 |
| 140 | 35 | 1 | 8.7 |
| | | 2 | 10.7 |
| | | 3 | 11.4 |
| 200 | 50 | 1 | 9.9 |
| | | 2 | 11.6 |
| | | 3 | 12.9 |

While especially suitable for covers for seating having complex three dimensional upholstered curves, the products of the invention may also be employed for other uses such as footwear and apparel. For shoe uppers the material may be made more dense and less pliable, though still relatively soft for the purpose, as described more fully later in this specification.

The 100% moduli of the skin, base sheet and adhesive may be determined in conventional manner, using cast films thereof, of uniform thickness and substantially free of defects. Those skilled in the art are well aware of techniques for preparing such films and for testing their tensile properties (ASTM D412). For instance, the elastomer solution used for the skin (e.g. "WITCOBOND Y 343" 35% solution mentioned above, without the added flame retardants and pigments) may be cast (e.g. at a wet thickness of about 15 to 20 mils) unto a temporary support which is a smooth releasing surface, such as smooth release paper, glass, etc., then dried in circulating air ovens at say 200° F. for 2 minutes and then at higher temperatures, say 300° F. for another 2 minutes, then stripped from the temporary support and tested. The latex used for the adhesive may be cast similarly and suitably dried as by leaving it in air at room temperature overnight and then heating in an oven at say 250° F. for 1 to 2 minutes to remove residual water; since the adhesive often has the "tack" which is characteristic of a soft elastomer, it may be desirable to dust its surface as with talcum powder to facilitate handling of the dried film. The solution of the polymer used to form the fibers may contain highly volatile solvent (such as the tetrahydrofuran mentioned above); in that case modifications may be desirable to insure formation of a substantially void-free uniform film. Thus, a tetrahydrofuran solution of that polyurethane (without the added fire retardants and pigments) may ba cast similarly and immediately protected against condensation of atmospheric moisture thereon, as by placing a glass plate over (but slightly spaced from) the cast film; the thus protected wet film may then be put immediately into a vacuum chamber (e.g. at a vacuum of 30 inches of mercury and at room temperature for say 16 hours) to strip off solvent, after which residual solvent may be removed by placing the film without its upper glass protection under the same vacuum but at higher temperature, e.g. 60° C.

The foregoing discussion has related to a material which is particularly suitable as an upholstery material. It has now been found that an excellent shoe upper material can be obtained by varying the impregnation or other treatment so as to produce a denser, more cohesive sheet; e.g. the process may be varied to increase the degree of penentration of the adhesive or binder into the fibrous sheet so as to increase the density of the product to at least about 0.4 g/cc, e.g. in the range of about 0.4 to 0.7 g/cc, preferably about 0.4 to 0.6.

FIGS. 10–15, and corresponding FIG. 10A, etc., are photomicrographs (made, as previously discussed, with a scanning electron microscope) of products suitable for shoe upper materials.

Figure 10:
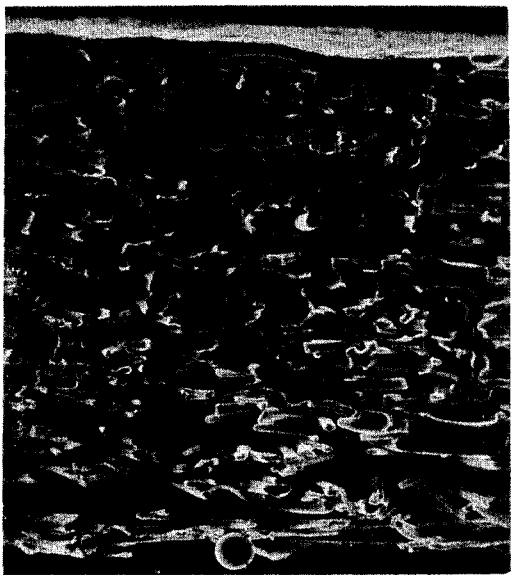
FIG. 10 is a cross-section as in FIGS. 1–9 of one finished shoe upper product.
Figure 10A:
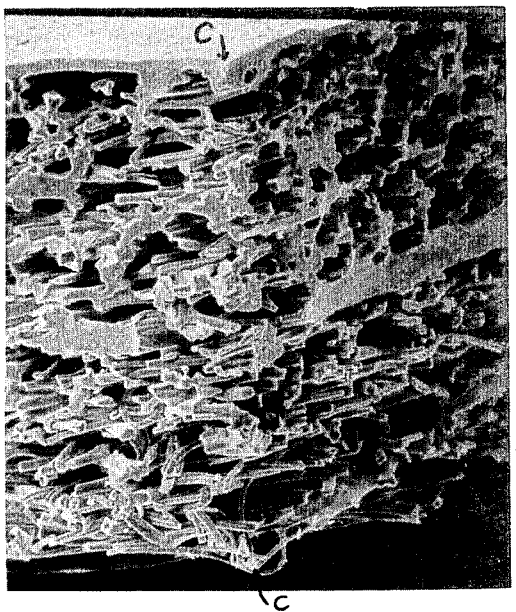
FIG. 10A is a cross-sectional view of the product of FIG. 10, showing a corner (defined by line C—C) formed by intersection of two planar cuts which are at right angles to each other (and also at right angles to the sheet, as in FIG. 10).
Figure 10F:
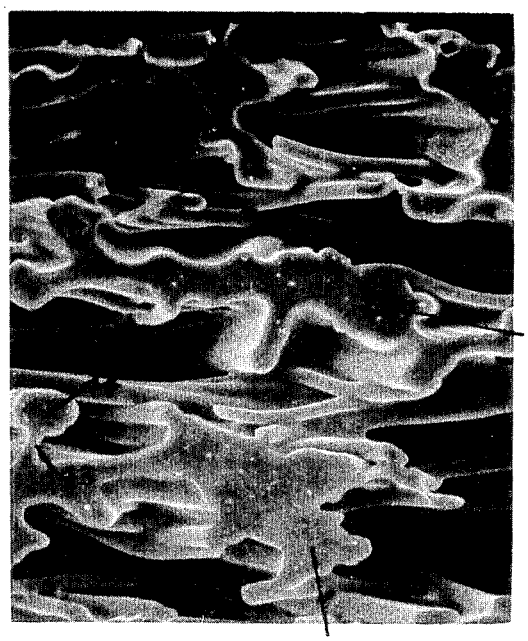
Figure 10B:
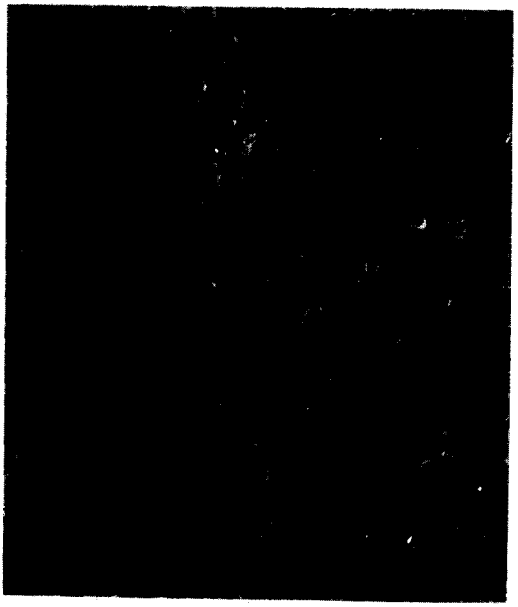
Figure 10C:
Figure 10D:

FIGS. 10B, C and D are cross-sections of the sheet product of FIG. 10 in planes parallel to that sheet, taken at various depths (thus FIG. 10C is taken at a level about half-way between the upper and lower surfaces, FIG. 10B is taken at a level about ¼ of the way down from the top and FIG. 10D is taken at a level about ¼ of the way up from the bottom. FIGS. 10B-1, 10C-1 and 10D-1 correspond to FIGS. 10B, 10C and 10D respectively but are at higher magnification.

Figure 1:
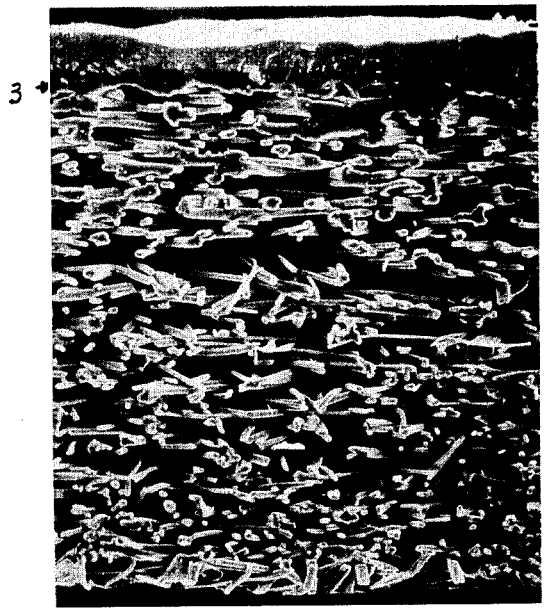
Figure 10E:
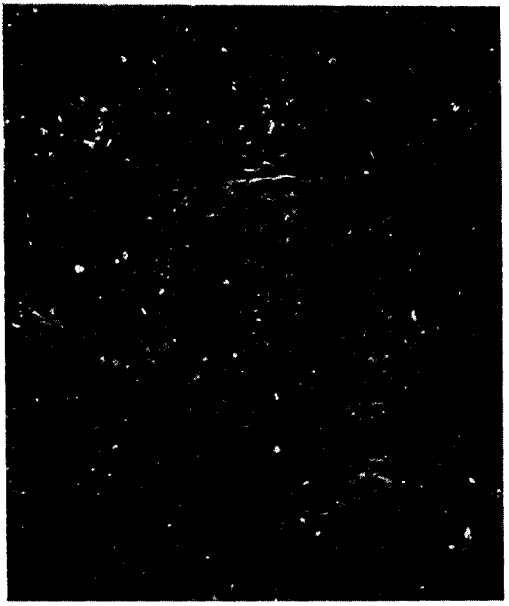
Figure 10:
Figure 10:
Figure 10:
Figure 10:
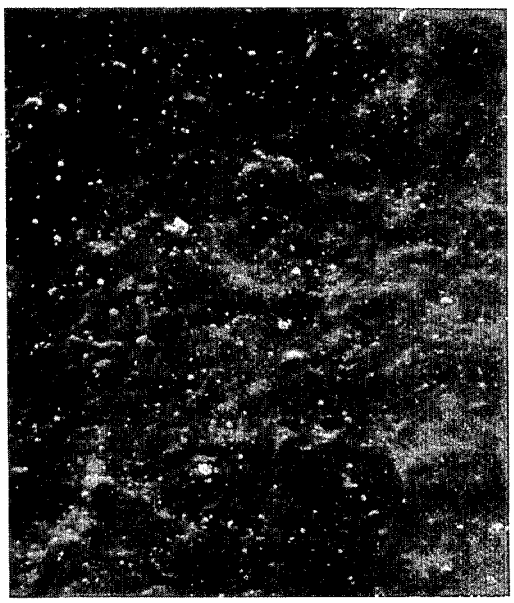

FIGS. 10E and 10E-1 are plan views (at two different magnifications) of the finished surface of the sheet of FIG. 10.

FIG. 10F is an enlarged view of a portion of FIG. 10.

Figure 11:
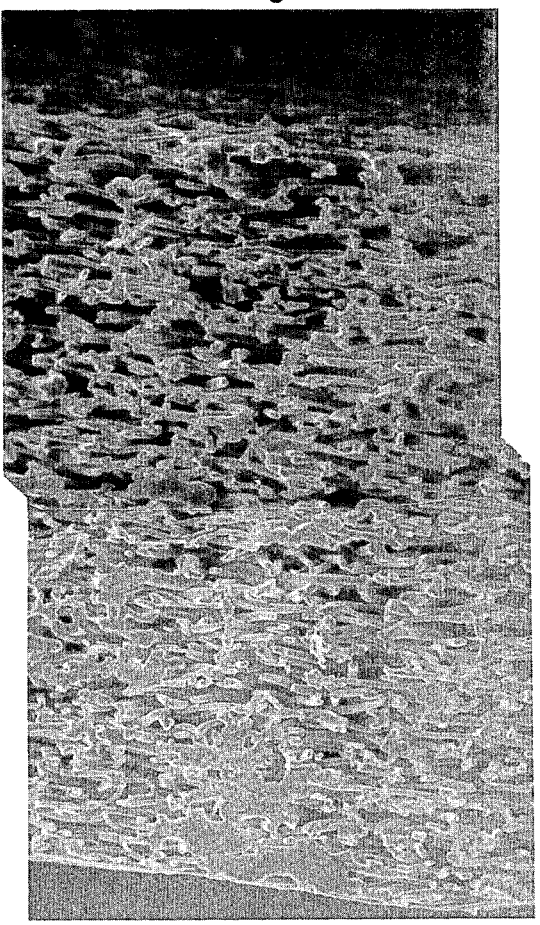

FIG. 11 is a cross-section of another sheet product, made in a different manner, suitable as a substrate (to be given a top finish).

FIGS. 11A and 11A-1 are plan views (at different magnifications) of a surface of the sheet of FIG. 11.

FIG. 11B is an enlarged view of a portion of FIG. 11.

FIG. 12 is a plan view of a finished surface of a product made by applying finishing materials to one surface of a sheet very similar to that shown in FIG. 11.

Figure 13:
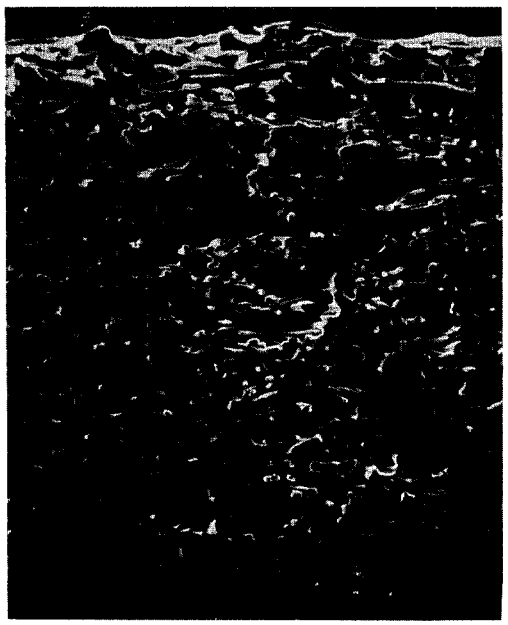

FIG. 13 is a cross-section of another sheet product suitable as a substrate.

FIGS. 13A, 13B and 13C are cross-sections of the sheet product of FIG. 13 is planes parallel to that sheet taken (like FIGS. 10B, C and D) at depths one fourth from the top surface (FIG. 13A), half-way between the top and bottom surfaces (FIG. 13B) and one fourth from the bottom surface (FIG. 13C).

FIG. 13D is a plan view of the upper surface of the sheet product of FIG. 13.

Figure 14:
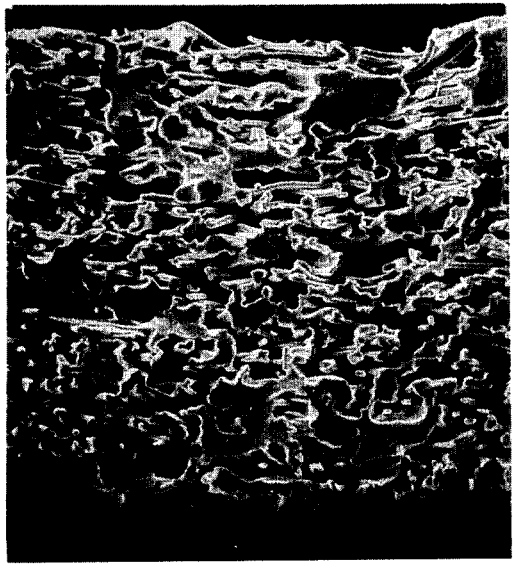
Figure 15:

FIG. 14 is a cross-section of another sheet product suitable as a substrate, and FIG. 15 is a cross-section of still another sheet product suitable as a substrate.

Turning now to FIG. 10 (and related FIGS. 10A, 10B, etc.), these show a product made by the use of a technique like that of Example 6. That is, the latex adhesive is applied to skin-coated release paper and then pressed against the fibrous sheet and the assemblage is passed through a nip having a predetermined gap. In making the shoe upper product illustrated in FIG. 10 however, the latex is of such low viscosity and is applied in such amount as to penetrate throughout substantially the whole thickness of the fibrous sheet. The ratio of latex solids to fiber solids in the product is in the range of about 1:4 to 1:3 (e.g. the product weighs about 14.5 ox/yd$^2$, its preformed skin weighs about 2 oz/yd$^2$ and the fibrous sheet before treatment weighs about 9.7 oz/yd$^2$).

Figure 6:
Figure 7:
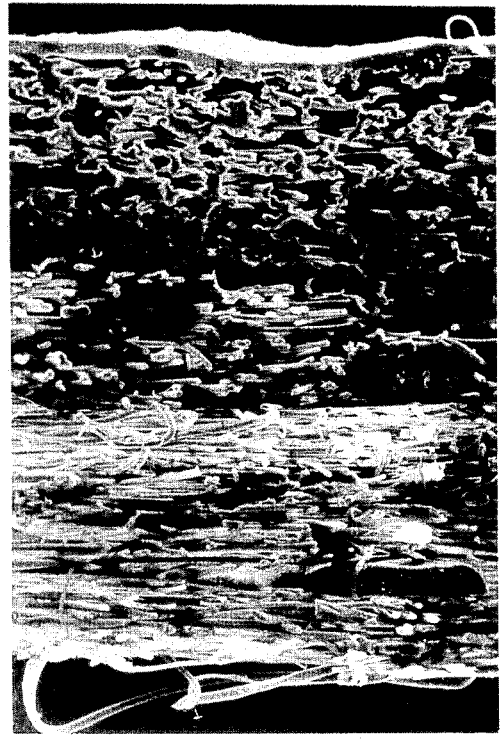
Figure 8:
Figure 5A:
Figure 6A:
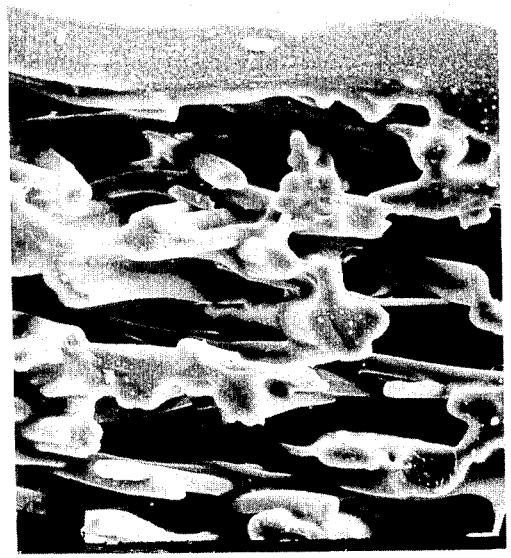
Figure 7A:
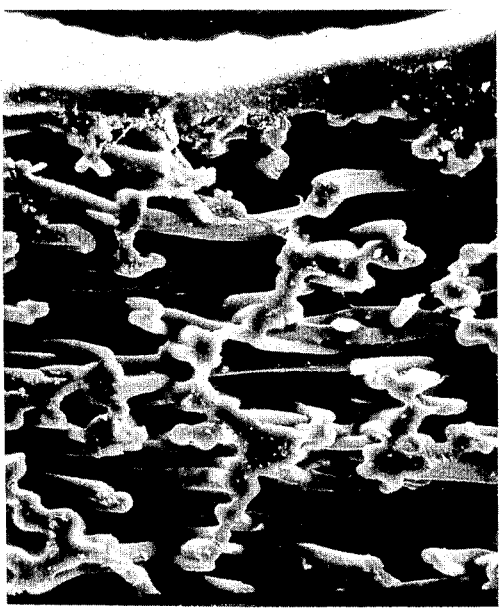
Figure 8A:
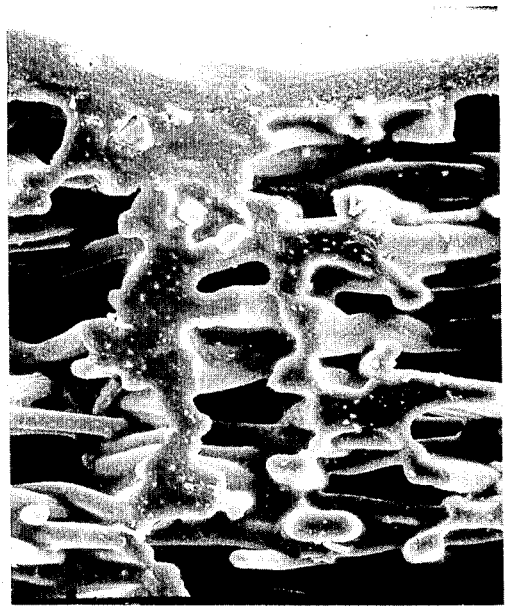
Figure 9:
Figure 9A:
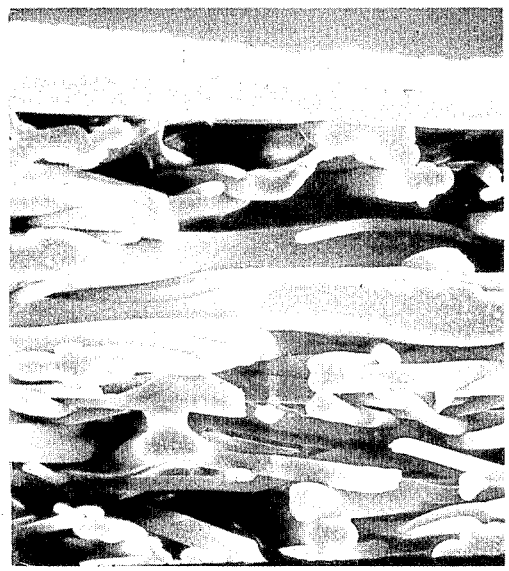
Figure 9B:
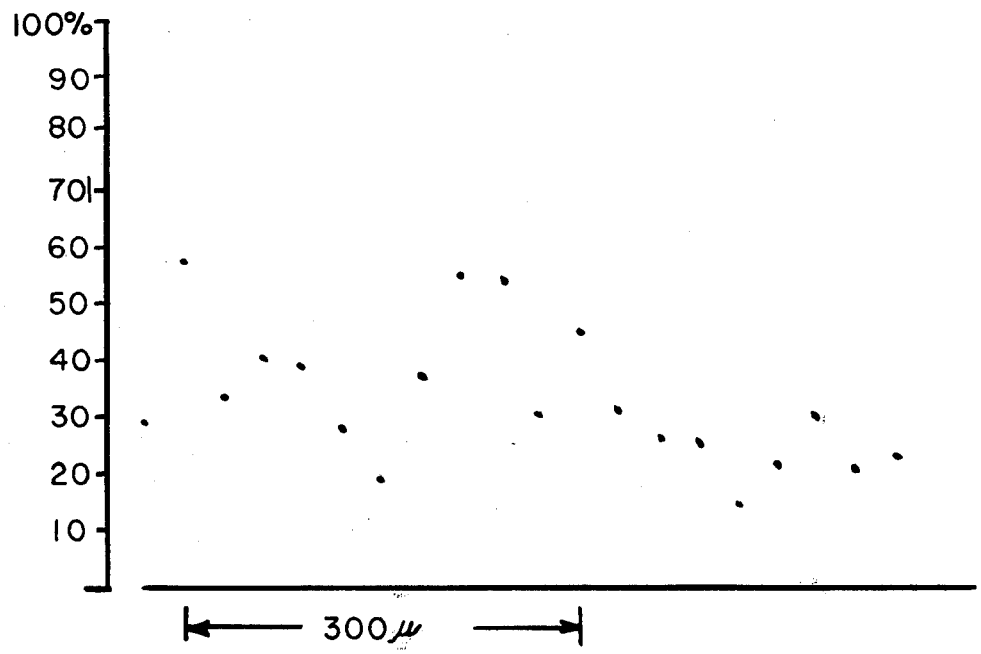

The material shown in FIG. 10 retains its fibrous character, as can be seen from FIGS. 10B to 10D (and 10B-1 to 10-D1) which are cross sections in planes parallel to the sheet, taken at various depths. It will be seen that the fibers substantially retain their criss-crossing direction parallel to the sheet and that there are webs or other shaped bodies of adhesive covering or bridging spaced fiber intersections. Cross-sections taken at right angles to the sheet (FIG. 10) show that in the zone below the skin the structure is similar to that seen in FIGS. 6–8. This is also shown in the view of a corner, in FIG. 10A. Unlike the structures of FIGS. 6–8, however, the binder or adhesive in FIGS. 10 and 10A is seen to extend, to a significant microscopically visible degree, through at least about 80% of the thickness of the sheet. It will be understood that, if desired the less-impregnated portion of the fibrous sheet (the "flesh" side which is at the bottom in FIGS. 10 and 10A) may be similarly impregnated with binder, as by applying a latex to that flesh side so as to effect a limited impregnation thereof. In fact one may start with products (such as those shown in FIGS. 6–8) in which the binder extends only partially (to an extent much less than 80% of the thickness) into the sheet and then apply a binder (e.g. elastomeric latex) from the "flesh side" so as to effect an extensive impregnation of the sheet and raise its density to above 0.4 and its overall impregnant: fiber ratio to say 1:4, 1:3 or more; this may be done, if desired, before the release paper is removed. For many purposes, however, it is desirable to have a less-impregnated flesh side (as shown in FIGS. 10 and 10A) since it has a more fibrous, softer, feel.

In the production of the material of FIG. 10 the latex-impregnated fibrous sheet is dried while bonded to a support (e.g. release paper) and the sheet is thus restrained against substantial shrinkage in area during drying of the latex. Some shrinkage in thickness, bringing the fibers closer together, does occur, e.g. the measured initial thickness of the fibrous sheet is about 53 mils and its measured final thickness is about 43 mils including about 1¼ mils of skin.

With respect to moisture vapor transmission the photomicrographs (e.g. FIGS. 10B–D) show that, despite the presence of the bonding agent, the structure of the impregnated fibrous sheet is very open; it has numerous open pathways, between intersecting fibers, for the passage of moisture vapor. The rate of moisture vapor transmission is thus governed in large part by the nature of the skin. In FIGS. 10 and 10A it will be seen that the skin is thin enough (e.g. about 20 to 40 microns thick) to permit the passage of water vapor even though, as shown in plan views of the top surface of the skin (FIGS. 10E and 10E-1) there are no pores which visibly (at 200× magnification) pass through the skin.

The water vapor permeability of the skin may be improved by using a thinner skin (e.g. 5, 10 or 15μ thick). It may also be improved by effecting at least a portion of the skin-solidification step by coagulation with non-solvent for the skin material rather than evaporation; thus one may bring the aqueous latex into contact with the skin-forming layer while the latter still contains significant amounts of water-miscible solvent for the water-insoluble skin material. For instance, the step of drying the skin layer (on the release paper) in an oven prior to contact with the latex may be omitted, or the skin layer may be only partially dried, so that it still contains a substantial amount of, say, dimethyl formamide when it comes into contact with the aqueous latex.

The exposed surface of the skin may be given additional finishing treatments such as those conventionally employed in the art; see for instance U.S. Pat. Nos. 3,764,363, 3,481,766, 3,481,767 and 3,501,326, and note also the treatments mentioned in Example 6 above.

In another embodiment the upper skin layer may be provided, on the sheet material, after the fibrous sheet has been impregnated. That is, an impregnated sheet, having a density of at least about 0.4 g/cc, may be used as a substrate for a shoe upper material in place of the substrates conventionally employed for this purpose, e.g. impregnated needled shrunk polyester non-wovens). For instance onto such as substrate there may be deposited or otherwise united, a relatively thin layer (having a thickness of, say, about 20 mils [500 microns]) of conventional water-vapor permeable microporous elastomeric polyurethane and such microporous layer may be finished in conventional manner, as described, for instance, in U.S. Pat. Nos. 3,873,406, 3,764,363, 3,481,766, 3,481,767 and 3,501,326.

Some materials useful as substrates for shoe upper materials are shown in FIGS. 11, 13, 14 and 15.

In FIG. 11 there is shown a cross-section of a material, having a density of about 0.51 g/cc, made by impregnating the fibrous sheet material with a latex and drying the impregnated material (in which the impregnant (solids):fiber ratio is about 1:4) in a heated press having one hot face and the other face at about room temperature. The photomicrograph is taken at a slight tilt so that one can see also a portion of the surface which has a highly open fibrous structure, as can be seen from the plan views (at different magnifications) in FIGS. 11A and 11A-1. FIG. 11 also shows the effect of differential heating during drying; the lower portion of the sheet seen in FIG. 11 was in contact with the hot face of the press and is considerably denser than the balance of the sheet; FIG. 11 indicates that the lower portion has both a higher fiber density and a higher impregnant density. When a sheet which varies in density across its thickness is used as the substrate, a skin, or a microporous layer having a skin, may be placed on either the more dense or less dense side of the sheet. The skin need not be of such thickness or smoothness as to conceal the underlying fibrous structure and it may in some cases have skin-traversing pores that are visible even under low magnification (e.g. at 20X). One such permeable skin showing the fiber pattern is shown in plan view in FIG. 12; in making this product the skin material was applied to the less dense side of the impregnated compressed sheet. The product of FIG. 12 has a good break and has an attractive appearance, and feel, like pigskin; also its abrasion resistance is much better than that of the material prior to the application of the skin or finish.

The substrate for shoe upper material may also be produced by impregnating to a suitable degree without compressing the product during drying. Various products made in this manner are show in FIGS. 13-15. In the material shown in FIGS. 13-13D the ratio of binder to fiber is about 1:4 and the material is permitted to shrink in area during drying; owing to such shrinkage its unit weight (17.2 oz/yd$^2$) and density (about 0.44 g/cc) are somewhat higher than those of the material of FIG. 10 even though both impregnated products were made from fibrous sheets of similar unit weight. Also the tongue tear strength of the material of FIG. 13, while adequate for shoe making, is considerably lower than that of the product of FIG. 10. The product shown in FIG. 14 was also made from a fibrous sheet of unit weight of about 9.8 g/cc in a manner similar to that of FIG. 13, but using conditions to place more impregnant into the structure (the ratio of impregnant to fiber is 1:2.5); here the shrinkage in area was about 25-30%. The tongue tear strength of the FIG. 14 product was higher than that of the product of FIG. 13, but somewhat lower than that of the product of FIG. 10.

Even when the content of impregnant is relatively high the moisture vapor transmission characteristics of the substrates are outstanding. For instance, a thicker product 72 mils thick), shown in FIG. 15, in which the impregnant:fiber ratio is about 1:2.4 and the overall density is about 0.52g/cc, has a moisture vapor transmission of about 145 g./m$^2$/hour. And for a product made with an impregnant:fiber ratio of 1:1.3 and an overall density of about 0.71 g/cc the M.V.T. value is about 54 g./m$^2$/hour; this product was made by reimpregnating, with this same latex, a previously impregnated and dried fibrous sheet.

Another technique for making the shoe upper material involves a combination of processes described above. For instance the fibrous sheet material may be impregnated with the latex (e.g. in proportions corresponding to say about 10 to 40 parts of dry impregnant per 100 parts of fibers) and, while the impregnated sheet is still wet (prior to substantial drying) it may be pressed against an adhesive layer resting on a skin on a temporary support (such as release paper) and the shole assemblage then dried; thus the wet impregnated substrate described in Example 13 below (65.3% wet pickup of KA 8066, 22.3% dry pickup) may be used as the wet impregnated substrate of Example 9 above. Combinations of layers of different densities or binder contents may be used. For instance the substrate may have a top layer composed of a fibrous sheet impregnated with a binder of relatively high modulus (e.g. a 100% modulus of about 1000 to 2000 psi, such as KA 8066, and a lower layer impregnated with a binder of considerably lower modulus (e.g. a 100% modulus in the range of about 200 to 1000 psi, such as KA 8100; the amount of binder in each layer may be, for instance, such that the impregnant:fiber ratio is about 1:0 to 1:2.5 (such as about 1:5 or 1:4) and the top layer may contain about as much fiber as the lower layer (and be of similar thickness) or it may contain less fiber (and be correspondingly thinner) than the lower layer, e.g. about 5 to 10 (such as 7) ounces of fiber per square yard of upper layer and about 10 to 15 (such as 12) ounces of fiber per square yard of lower layer. A two-layer substrate product of this type may be soft overall, owing to its more pliable binder in the lower layer, while having the very good gouge resistance of its upper layer containing the less pliable high modulus binder. The two layers may be adhered by pressing them together while they are, for instance, still wet with latex impregnant, followed by drying. A skin may be present on the upper layer.

Substrates produced in accordance with this invention, such as those of examples 11, 13, 14, and 15, exhibit a good break even without a skin layer. They also show a desirable good "roll" and a desirable round "fold." Thus the "roll" may be observed by grasping the sheet between the thumb and forefinger of each hand, with the thumbs spaced about an inch apart, then bending the sheet so that it forms a 180° arc between the thumbs, and then moving one hand back and forth so as to move (or "roll") that arc along the sheet material; the movement occurs smoothly, without periodic variations in resistance to such movement. The folding characteristics may be observed by folding the sheet and then folding it again transverse to the first fold; both folds are seen to be smooth arcs.

The products for use in shoe uppers, such as those described above, are sheets of criss-crossing elastomeric fibers running parallel to the surfaces of the sheet. They contain a polymeric binder adhered to the fibers within the sheet, the weight ratio of binder to fibers being in the range of about 1:10 to 6:10 or 7:10 preferably about 2:10 to 5:10 or less. The proportion and position of the binder in the sheet is such that the interior of the sheet still has a definite structure of criss-crossing fibers running parallel to the surfaces of the sheet, with open pathways between intersection fibers, and the sheet is highly porous; its pores constitute about 2/5 to ⅗ or ⅔ of the volume of the sheet.

Figure 2:
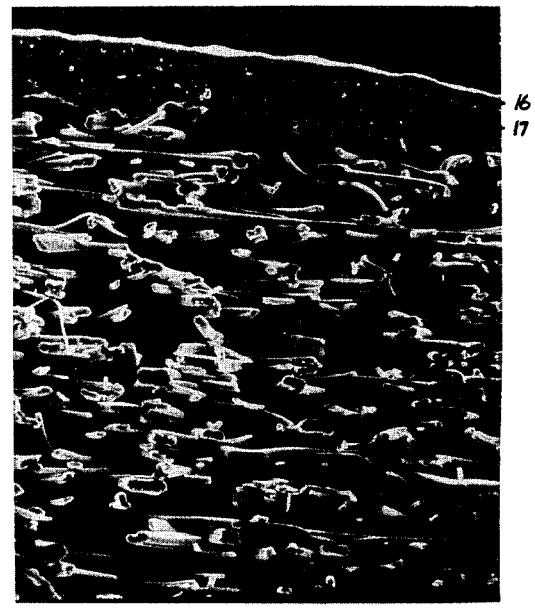
Figure 3:
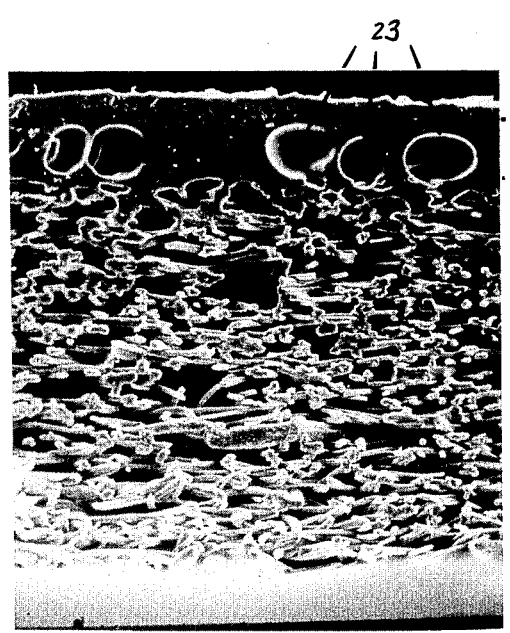
Figure 4:
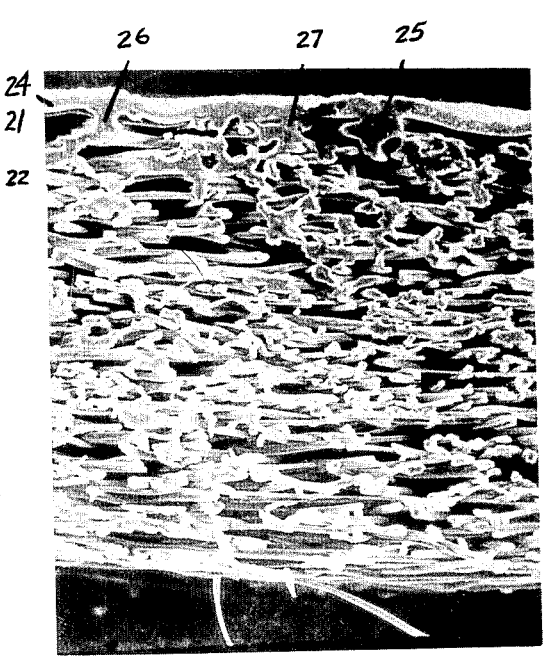
Figure 1A:
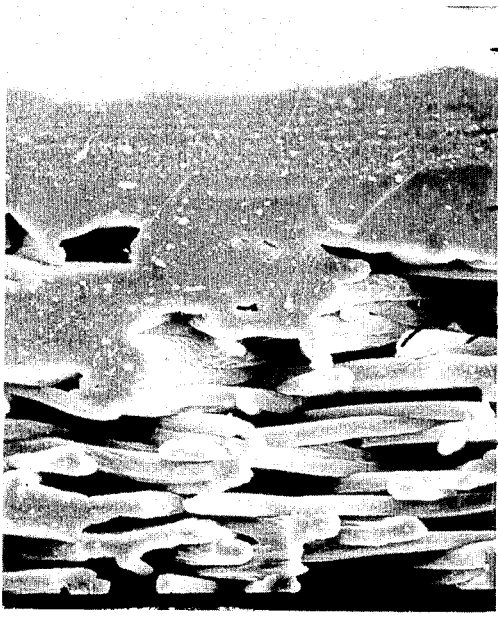
Figure 2A:
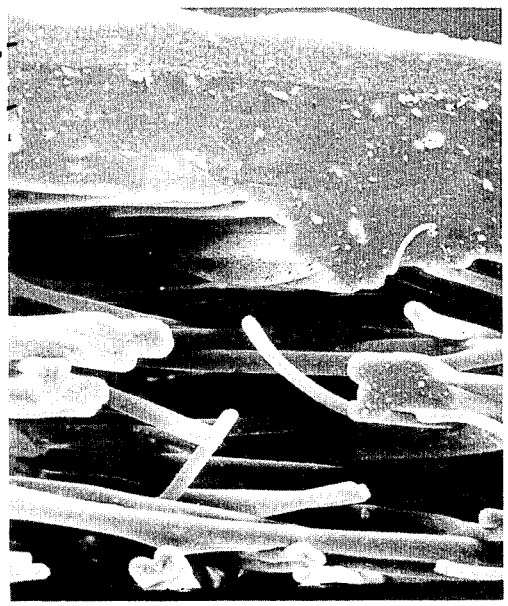
Figure 3A:
Figure 4A:
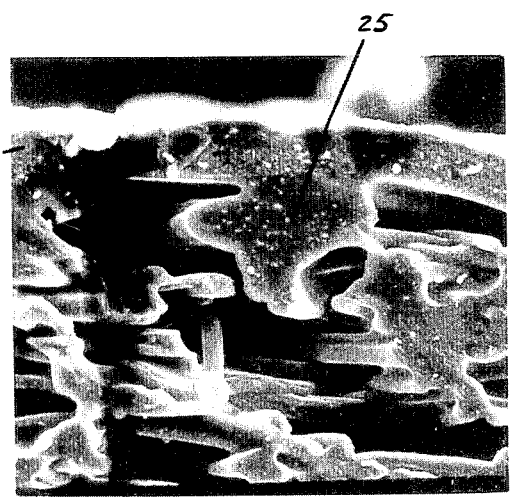
Figure 1B:
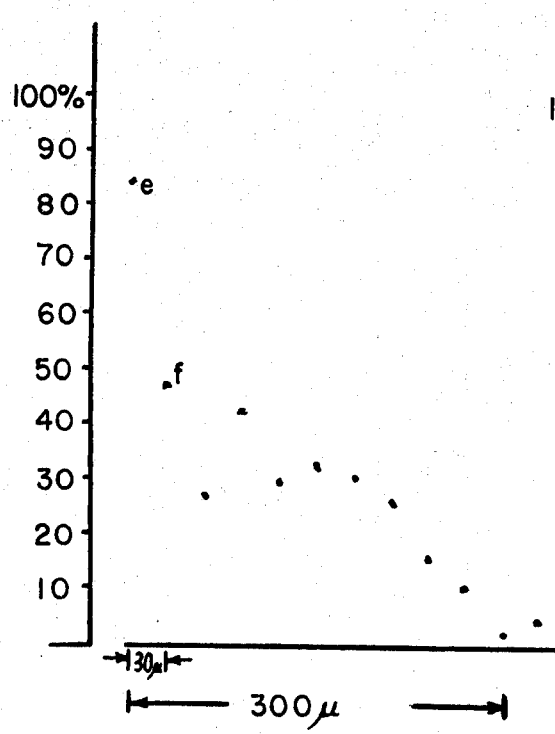
Figure 2B:
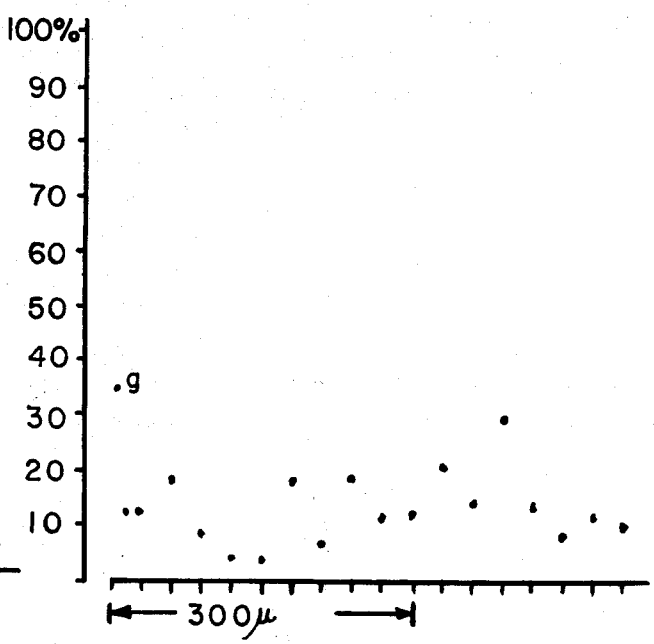
Figure 3B:
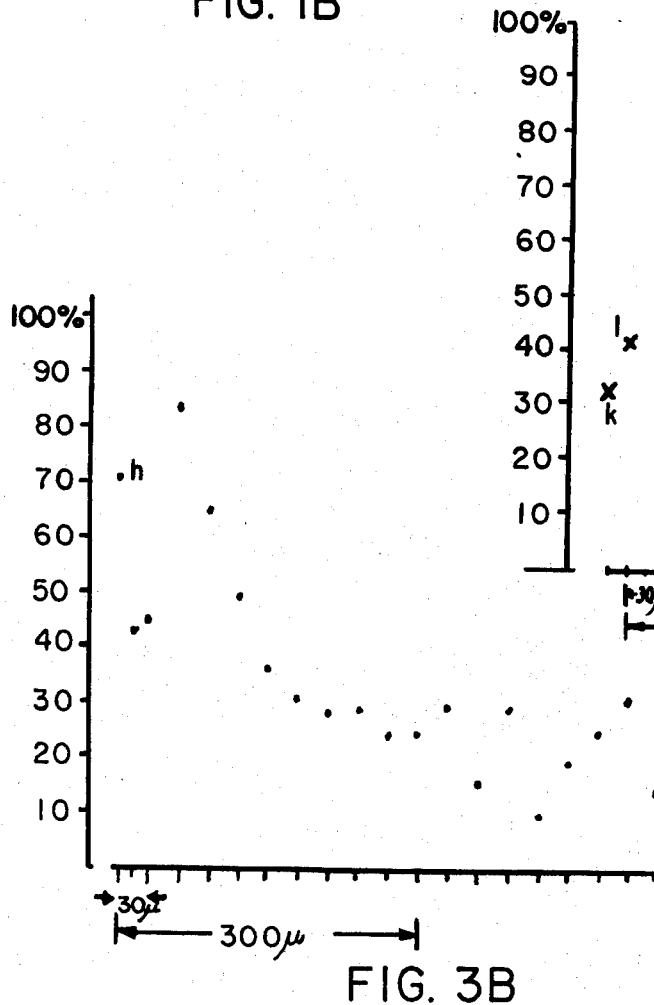
Figure 4B:
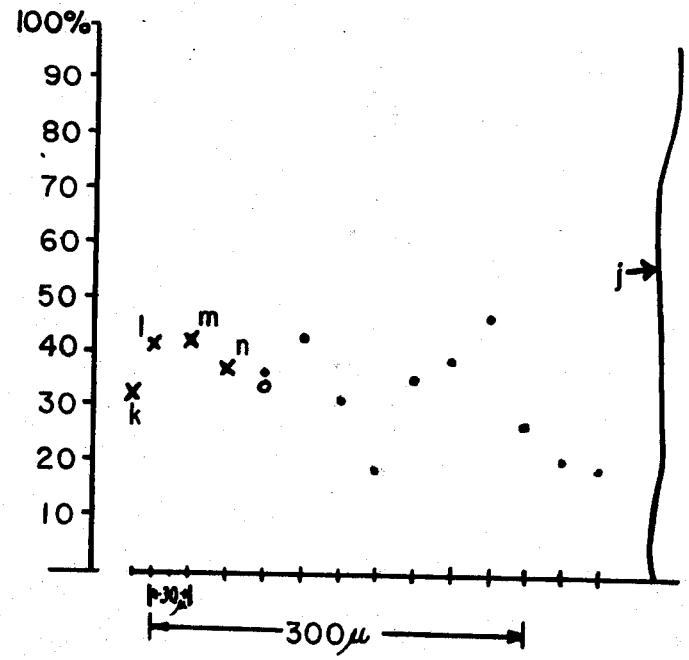
Figure 5:
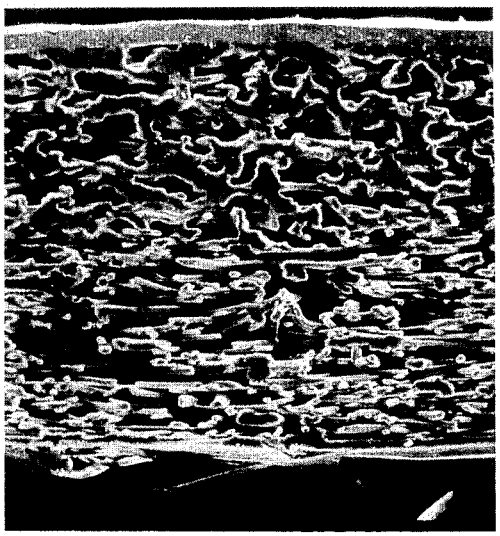

In one preferred form, the proportion and position of the binder is such that irregular bodies, or matrices, of the binder surround, and are firmly bonded to, a plurality of overlying intersecting fibers (such as 3, 4 or more such fibers). Thus in the enlarged view, in cross section, shown in 10F one can see that the lowermost visible body 41 of binder bonds together well over 5 intersecting fibers; furthermore this body 41 appears to be part of a larger meandering finger or matrix of binder which includes at least the central, similar, body 42. Also visible are thin webs, or necks, of binder joining two vertically spaced filaments, such as web 43 bonded to filament 44. The structure is similar to that seen in the upper portions of the fibrous zones of FIGS. 4 to 8 (and 4A to 8A). The enlarged view in FIG. 11B illustrates similar structures such as the integrated cluster 46 of multidirectional straight intersecting fibers. As seen in FIG. 10A it appears that the binder penetrates into the fiber structure as irregular meandering fingers disposed at, and joining, fiber intersections. The binder itself is seen to be substantially non-porous even at high magnification (such as the 300X magnification in FIG. 10F), unlike the microporous coagulated binders customarily found in impregnated non-wovens used for shoe uppers; compare the illustrations in the article by O. Fukushima entitled "Construction of Man-Made Leather" in J. Coated Fabrics Vol. 5 (July 1975) pages 3–15, notably FIGS. 2–4 at pages 8 and 9 of that article.

In the manufacture of shoes the shoe upper materials of this invention may be employed in place of leather, using conventional shoe-making techniques for men's and women's shoes, such as described in the booklet "How American Shoes Are Made" copyright 1961 by United Shoe Machinery Company. Products of this invention have been found to "make up" well during lasting and related shoe making operations, to produce shoes with a comfortable soft, pliable feel and free of "orange peel" or other "show-through" effects, to show high tear strengths to other shoe components when bonded thereto with say, water based adhesives, and to behave substantially isotropically for efficient cutting of shoe upper sections.

EXAMPLE 10

This Example describes the making of the product of FIG. 10. It uses a technique like that of Example 6. That is, the latex adhesive is applied to skin-coated release paper and then pressed against the fibrous sheet and the assemblages is passed through a nip having a predetermined gap. However, in this example the adhesive latex is of such low viscosity and is applied in such amount as to penetrate throughout substantially the whole thickness of the fibrous sheet.

A fibrous substrate as in Example 1 weighing about 9.7 oz/yd$^2$ and having a thickness of about 52 mils is laminated to a preformed polyurethane skin (1.5 mil thick) on release paper using an aqueous dispersion of anionic polyurethane. The skin is formed by coating the release paper with a 9 mils (wet) film of polyurethane solution having a viscosity of 7400 centipoises (Brookfield LVF, spindle #4, 30 rpm at STP) and consisting of a 35% solution of light stable aliphatic polyurethane (as described on page 12 of Ser. No. 512,265) and evaporating solvent from the film. The aqueous adhesive, consisting of 30 parts KA8066, 1.9 parts Inpranil P.W., and 1.8 parts of water, is then applied as a 12 mils (wet) layer to the preformed skin and the fibrous substrate is laid into the wet adhesive. Then the composite of fibrous substrate, adhesive, preformed skin, and release paper is passed between the nip rolls of a laminator set at a 25 mils gap and then through a 35 ft., 225° F. (118° C.) oven at the rate of 12 ft. per minute, i.e. a residence time of about 3 minutes. The release paper is then removed from the laminate. The release paper used is S. D. Warren's T/K Vem ClS Corinthian (whose thickness is about 9 mils). The product shows a very good "break." Its moisture vapor transmission is about 46 g/m$^2$/hr. Its tongue tear strength is 8.4 lb/in in one direction and 8.0 lb/in. in the cross-direction; it will be seen that it is substantially anisotropic (the difference in strengths in different directions of the products of this invention are usually well below 20% and generally below 10%, such as the 5% difference shown by the foregoing tongue tear strength figure).

EXAMPLE 11

The product of FIG. 11 which is about 64 mils (1.63 mm) thick is prepared by laminating together two wet impregnated fibrous sheets. Prior to impregnation each fibrous sheet, as in Example 1, is about 55.3 mils (1.4 mm.) thick and has a density of 0.234 gms/cc. The laminating is carried out by laying one sheet on top of the other and impregnating the composite with a 30% aqueous solution of linear polyurethane made by diluting polyurethane latex KA 8066 (Mobay Chemical Co.) with water. The amount of impregnant pick up is 23.4% (dry basis) based on the weight of composite. The impregnated composite is placed between sheets of release paper and then compressed to a thickness of 64 mils (1.63 mm) in a heated press, for 90 seconds with the top platen of the press set at 320° F. (160° C.) and the bottom platen set at 110° F. (38° C.). The laminate is then removed from the press and heated at 250° F. (121° C.) for 5 minutes to remove residual water. The resulting footwear substrate may be finished by any suitable method, e.g., spraying, printing, or by lamination of a skin or foil to one side, to obtain a finished material suitable for shoe uppers.

The sheet product has a tensile strength (lb. per inch of width) of about 60M, 86T; an elongation at break of 364% M, 400T; the forces (pounds per inch of width) needed to stretch the material are as follows: 5% stretch, 5.3 M 6.8 T; 25%, 10 M 13.2 T; 100%, 18 M 22.5 T; 300%, 46 M, 57 T; and its trapezoidal tear strength (lbs.) is 28M, 26T.

EXAMPLE 12

The product of FIG. 12 is prepared from an impregnated pressed composite like that of Example 11. Before drying the compressed wet composite, it is intaglio printed (two passes from an engraved print roll having 120 lines per inch) with a brown pigmented 10% solution of elastomeric polyurethane in dimethyl formamide. It is then dried for five minutes in hot air at 250° F (121° C), then printed again in the same way and again dried for 5 minutes at 250° F, then printed successively with a similar elastomeric polyurethane solution (in a darker red color) and with a clear elastomeric light-resistant polyurethane solution, being dried between prints.

EXAMPLE 13

This Example describes the making of the product of FIG. 13.

A rectangular piece (8.5 × 11 inches in dimensions) of a fibrous substrate, as in Example 1, 63 mils (1.35 mm.) thick and weighing 9.62 oz.yd$^2$ (0.242 g./cc.) is impregnated, using a textile padder, to 65.3% wet pickup (dry pickup 22.3%) with a 40% aqueous dispersion of anionic high molecular weight, thermoplastic polyurethane (KA8066).

The wet impregnated substrate is dried in a hot air oven for 10 minutes at 300° F. (140° C.) During drying the impregnated material shrinks in area about 25%.

The sheet product has a tensile strength (lbs. per inch of width) of about 43; an elongation at break of about 350%; the forces (pounds per inch of width) needed to stretch the material are approximately as follows: 5% stretch, 3.4; 25%, 7.3; 100%, 14.3; 300%, 35.5; and its tongue tear strength (lbs.) is about 5.9 M 6.1 T.

EXAMPLE 14

The product of FIG. 14 is produced as in Example 13 except that the padder is adjusted so that the dry pickup is about 40%.

The sheet product has a tensile strength (lbs per inch of width) of about 43 M, 51 T; an elongation at break of about 360 M, 360 T; the forces (pounds per inch of width) needed to stretch the material are approximately as follows: 5% stretch, 3.8 M, 5.1 T; 25%, 8.2 M, 9.7 T; 100%, 14.9 M, 16.5 T; 300%, 35.2 M, 40.8 T; and its tongue tear strength (lbs.) is about 7.6 M, 7.7 T.

EXAMPLE 15

The product of FIG. 15 is produced as in Example 13 using a fibrous substrate, as in Example 1, 89.4 mils (2.27 mm) thick and weighing 15 oz/yd.$^2$ (0.224 g./cc). The dry pickup is about 42% and the shrinkage in area is less than 20%.

The sheet product has a tensile strength (lbs. per inch) of width) of about 80; an elongation at break of about 420%; the forces (pounds per inch of width) needed to stretch the material are approximately as follows: 5% stretch, 5.4; 25%, 12.3; 100%, 21.2; 300%, 49.2; and its tongue tear strength (lbs) is about 11.7 M, 11.9 T.

For use in shoe uppers the product will usually have a thickness in the range of about 0.8 to 2.0 mm, preferably in the range of about 0.9 to 1.8 mm. Thus the products of the Examples have the following approximate thicknesses:

| Example | 10 | 11 | 12 | 13 | 14 | 15 |
|---|---|---|---|---|---|---|
| Thickness (mm) | 1.1 | 1.6 | 1.6 | 1.3 | 1.2 | 1.8 |

In this application all proportions are by weight unless otherwise indicated. In the Examples atmospheric pressure is used unless otherwise indicated.

It is understood that the foregoing detailed description is given merely by way of illustration and that variations may be made therein without departing from the spirit of the invention. The "Abstract" given above is merely for the convenience of technical searcers and is not to be given any weight with repect to the scope of the invention.

We claim:

1. A sheet product having a thickness of about 30 to 60 mils and an elongation over 200% and having a leather-like "break," comprising a base sheet of criss-crossing elastomeric polyurethane fibers, having an average diameter of about 5 to 20 microns, running parallel to the surfaces of the sheet, said fibers being bonded together at their points of contact, said product having a substantially non-porous elastomeric surface skin layer up to about 100 microns thick, comprising a substantially non-porous elastomeric polyurethane preformed skin about 20 to 50 microns thick, said preformed skin being bonded to said base sheet by spaced fingers of elastomeric adhesive which extend from said layer into said fibrous base sheet and which reinforce the fiber-to-fiber bonds in the zone of the base sheet below said skin layer, the bases of said fingers adjacent to said layer comprising less than half the length of said layer, as viewed in cross section perpendicular to said layer, the lower third of said base sheet having a density below 0.4 g/cc.

2. A product as in claim 1 in which there are large voids whose dimensions, viewed in cross section, are at least about 30 microns by 30 microns occupying at least about one third of the zone just below said non-porous zone.

3. A product as in claim 1 in which the ratio of the 100% moduli of said skin and base sheet is in the range of about 1:2 to 3:2 and said adhesive has a 100% modulus lower than that of both said skin and base sheet.

4. A product as in claim 1 in which said skin has a 100% modulus below about 1400 psi and above 500 psi and said adhesive has a 100% modulus less than that of said base sheet.

5. A product as in claim 4 in which said skin has a 100% modulus of about 800 psi and said adhesive has a 100% modulus about 200 to 400 psi.

6. A seat having complex upholstered curves, said seat being covered with a product as in claim 5.

* * * * *